(12) United States Patent
Willoughby

(10) Patent No.: US 8,378,195 B2
(45) Date of Patent: Feb. 19, 2013

(54) CHORD TEACHING APPARATUS

(76) Inventor: Andrew Jay Willoughby, Rochester, NY (US)

( * ) Notice: Subject to any disclaimer, the term of this patent is extended or adjusted under 35 U.S.C. 154(b) by 108 days.

(21) Appl. No.: 13/088,536

(22) Filed: Apr. 18, 2011

(65) Prior Publication Data

US 2012/0085221 A1 Apr. 12, 2012

Related U.S. Application Data

(60) Provisional application No. 61/342,636, filed on Apr. 16, 2010.

(51) Int. Cl.
*G09B 15/00* (2006.01)
(52) U.S. Cl. ..................................... 84/477 R
(58) Field of Classification Search ............... 84/470 R, 84/471 R, 473, 471 SR, 477 R, 478, 479 R, 84/479 A, 483.1, 483.2, 484, 485 R, 485 SR
See application file for complete search history.

(56) References Cited

U.S. PATENT DOCUMENTS 2,888,849 A * 6/1959 Humphrey et al. ............. 84/686
4,516,465 A * 5/1985 Kani ........................... 84/470 R

* cited by examiner

*Primary Examiner* — Kimberly Lockett
(74) *Attorney, Agent, or Firm* — Steven R. Scott

(57) ABSTRACT

The invention provides a musical indicating device for finding the 12 most common chord types and their inversions on string and fretted musical instruments. It can be generally formed as a thin sheet-like base member with a front featuring 12 different transparent chord dials that are each pivotally attached to the base member over a color-coded, pie-shaped diagram of the Willoughby Scale/Chromatic Scale. On the back is a transparent Diatonic Octave Dial pivotally attached to the base member over a color-coded diagram of the Chromatic Scale/Willoughby Scale with the Key Signatures surrounding the diagram. The octave dial has selectively aligned indicia that represent the notes of the major form of the diatonic scale.

12 Claims, 37 Drawing Sheets

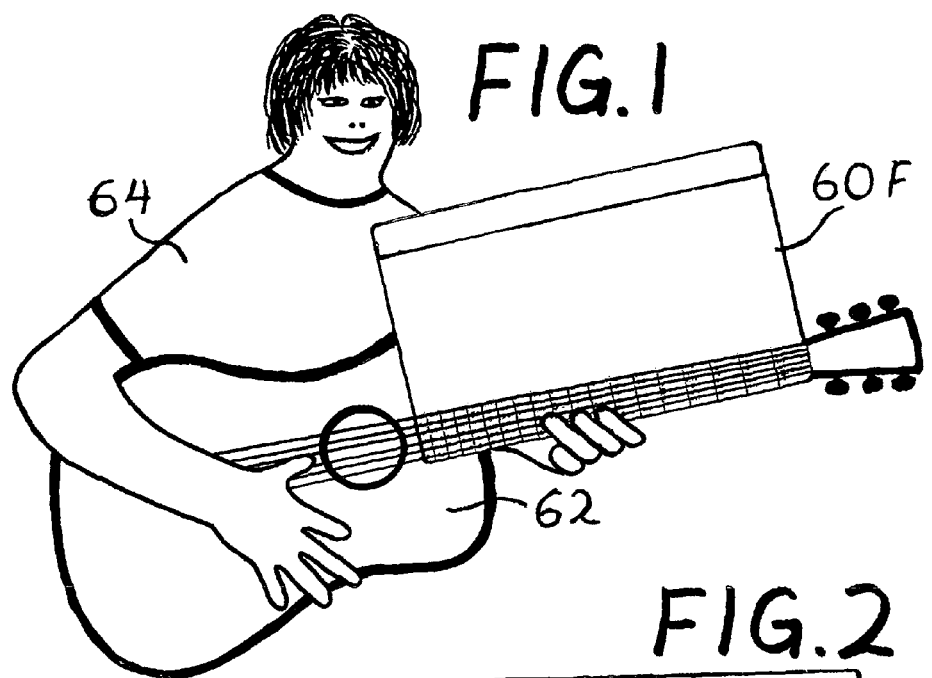
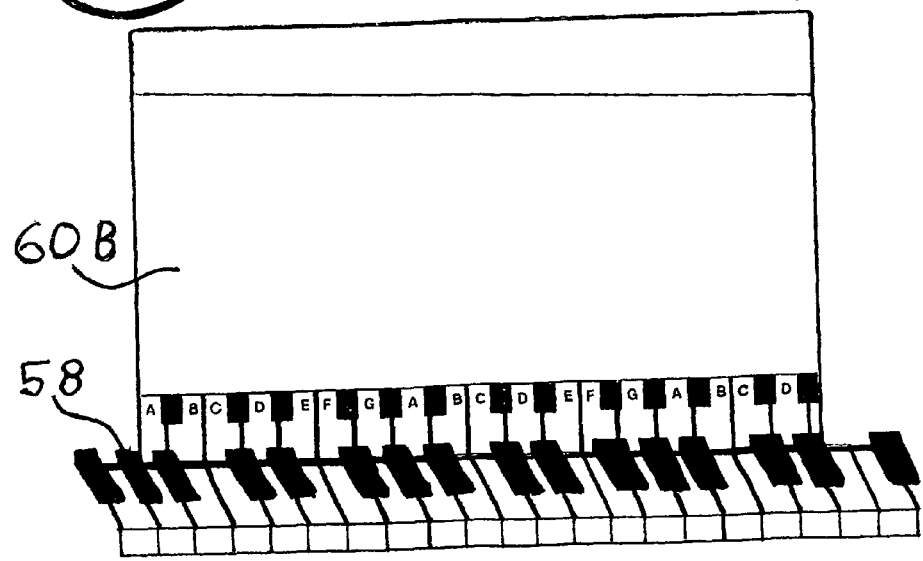

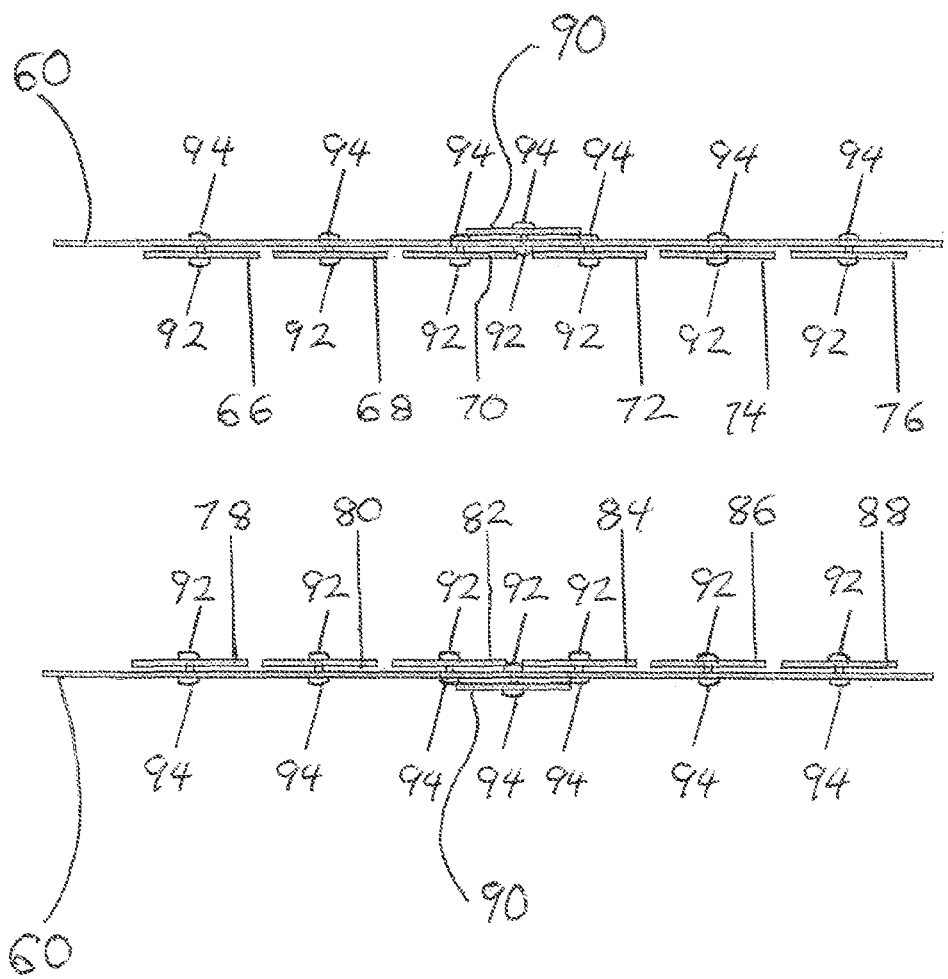

CHORD TEACHING APPARATUS

PRIORITY CLAIM TO PARENT APPLICATION

This application claims priority to a provisional application titled "Chord Teaching Apparatus" (Ser. No. 61/342,636) filed Apr. 16, 2010, the same being incorporated herein by reference.

BACKGROUND OF THE INVENTION

1. Field of the Invention

My invention pertains to a unique simplified system, method and associated apparatus for teaching and implementing musical principles, especially those related to the musical chords of Western Music. More particularly, the Chord Teaching Apparatus of this invention (hereinafter referred to as "Chordteacher") simplifies learning and teaching of Western Music by putting individual chords on individual chord dials, by putting the Diatonic Octave on its own separate dial, and by putting the simulated piano keyboard and guitar fret board at the user's fingertips.

2. Prior Art in the Field

For the first thousand years of Western Music, the musical staff consisted of 11 lines and 10 spaces, the middle line representing the C note (middle C). Every line and space represented a natural note, the white notes on a modern piano. There were no black notes (the sharps or flats), nor any room for any additional notes on the musical staff. It was a very simple, easy-to-read system.

In time, to simplify the notation and make the staff easier to read, the musical staff was divided into the treble and bass clefts. Each line and space represented the natural notes (the white notes on the piano keyboard) labeled after the first 7 letters of the Alphabet: A, B, C, D, E, F, and G.

For centuries in Europe, Western Music was made up of these 7 different notes, and was played in the 7 church modes: Phrygian, Lydian, Mixolydian, Aeolian (minor), Locrian, Ionian (Major), and Dorian. The most commonly used church mode was the Ionian (Major) mode, otherwise known as the key of C. Musicians of that time were not aware that the Ionian mode is only $\frac{1}{6}$ of the music spectrum.

Around 1200 A.D., the Germans started at the note F and tried to play Do Re Mi Fa Sol La Ti Do. As they played Fa (IV or B natural), they noticed B natural didn't quite sound right. It was just a little too high, and they realized that there must be a note between A and B and they discovered a new note that was there all along in the music spectrum. The Germans called this new note H. This was the first new note ever discovered in Western Music, and the key of F major was born, becoming the $2^{nd}$ Major Key. There was no room for this new note on the staff. To accommodate this new note, the Germans added a flat symbol in front of the note B, lowering the B by a ½ step. The H note is now known as B flat, or A sharp.

Music grew by a tetra chord counter-clockwise. Now we have 8 different notes, and are playing ¼ of the music spectrum.

Around 1250 A.D., another European started at the note G and tried to play Do Re Mi Fa Sol La Ti Do. As they played Ti (VII or F natural), they noticed F natural didn't quite sound right. It was just a little too low, and a new note was discovered between F and G—the $2^{nd}$ black note which was called F sharpened (sharpened meant to raise). The key of G major was thus born, becoming the 3rd Major Key. There was no room for this new note on the staff. To accommodate this new note, a sharp symbol was added in front of the note F, raising the F by a ½ step. This note is now known as F sharp, otherwise known as G flat.

Music grew by a tetra chord clockwise. Now we have 9 different notes, and are playing ⅓ of the music spectrum.

E flat was probably discovered next around 1300 A.D., and became the $3^{rd}$ black note. It comes in at the position of Fa (IV) in the key of B flat Major, and the key of B flat was born and becomes the $4^{th}$ Major Key. There was no room for this new note on the staff. To accommodate this new note, a flat symbol was added in front of the note E, lowering the E by a ½ step. E flat is also known as D sharp.

Music grew again by a tetra chord counter-clockwise. Now we have 10 different notes, and are playing 5/12 of the music spectrum.

C sharp was probably discovered around 1350 A.D., and became the $4^{th}$ black note. It comes in at the position of Ti (VII) in the key of D Major and the key of D was born and becomes the $5^{th}$ Major Key. There was no room for this new note on the staff. To accommodate this new note, a sharp symbol was added in front of the C note, raising the C by a ½ step. C sharp is also known as D flat.

Music grew yet again by a tetra chord clockwise. Now we have 11 different notes, and are playing ½ of the music spectrum.

The $5^{th}$ and final black note discovered was G sharp (also known as A flat) around 1450 A.D. There was no room for this new note on the staff. To accommodate this new note, a sharp symbol was added in front of the G note, raising the G by a ½ step. G sharp is also known as A flat.

This new note of G sharp-A flat makes 7 more Major keys possible: E flat, A, A flat, E, C sharp-D flat, B-C flat, and F sharp-G flat. Suddenly, music grew 6 more tetra chords counter-clockwise and clockwise, completing the circle of the entire music spectrum. Now we have all 12 notes of the chromatic scale, consisting of the 7 original white notes—A, B, C, D, E, F, and G—and the five new black notes—C sharp-D flat, D sharp-E flat, F sharp-G flat, G sharp-A flat, A sharp-B flat. The entire music spectrum consists of 48 notes, 36 steps, and 12 half-steps, encompassing all twelve Major keys.

Sometimes notes are double sharps represented by an X symbol in front of the note to sharpen it twice, raising it by a whole step. Sometimes notes are double flats represented by 2 flat symbols in front of the note to flatten it twice, lowering it by a whole step. Other times, notes that are already sharps or flats need to be natural, represented by a natural symbol in front of the note.

From 1200 A.D.-1450 A.D., the music staff became overcrowded and overwhelmed by 5 additional notes, each having 2 separate names, the double sharps, the double flats, and the natural signs, confusing the formerly simple system. The Willoughby Scale is my personal attempt to fix this confused system and replace it with order and simplicity. It also explores the science of mathematics and harmony for future generations.

Western Music left us with 12 notes that can be arranged in a circle in a clock formation, starting at C up top. Three note chords can be connected in this circle to form triangles, and four notes chords can be connected to form trapezoids. Humans have sung in octaves for centuries in Europe, until the 5 black notes were discovered. However, though the foregoing understanding of musical harmony has allowed me to diagram these chords in their pure mathematical forms, the various inventions of others intended to implement the learning and teaching of Western Music, have been found to be confusing, complicated, and not user-friendly. Consequently, there is a long felt need for further advances in this area.

SUMMARY OF THE INVENTION

The Chordteacher of my invention satisfies the long felt need described above. In its preferred embodiments, as illustrated herein, it is printed on a flexible, somewhat rigid, polystyrene plastic or similar type material. Across the top front is the printed replica of a 6-stringed guitar fret board, comprising 6 horizontal color-coded lines representing the 6 strings of a guitar, and 18 vertical lines representing the 18 frets. Each fret is numbered 1-18. All of the chromatic notes are color-coded and labeled at the intersections of the strings and frets.

Across the bottom front of the Chordteacher is the printed replica of a piano-type musical keyboard with all of the chromatic notes color-coded and labeled. Above each piano key is printed the corresponding note of the "Willoughby Scale" of my invention.

The Willoughby Scale renames the Chromatic Notes as follows:

| | | |
|---|---|---|
| B = O | D sharp/E flat = S | G = W |
| C = P | E = T | G sharp/A flat = X |
| C sharp/D flat = Q | F = U | A = Y |
| D = R | F sharp/G flat = V | A sharp/B flat = Z |

Across the middle of the front of the Chordteacher is printed the 12 pie-shaped color-coded Chromatic Scales/Willoughby Scales with 12 transparent chord dials. Each chord dial is pivotally attached to the base of the Chordteacher by a nylon or similar rivet, and each chord dial is located over one of the 12 pie-shaped color-coded Chromatic Scales/Willoughby Scales.

The chord dial types are as follows. The Major Chord Dial, comprised of a Major $3^{rd}$, a Minor $3^{rd}$, and a Perfect $4^{th}$. The Minor Chord Dial, comprised of a Minor $3^{rd}$, and Major $3^{rd}$, and a Perfect $4^{th}$. The Diminished Chord Dial, comprised of a Minor $3^{rd}$, a Minor $3^{rd}$, and a Tritone. The Augmented Chord Dial, comprised of a Major $3^{rd}$, a Major $3^{rd}$, and a Major $3^{rd}$. The Suspended $2^{nd}$ Chord Dial, comprised of a Step, a Perfect $4^{th}$, and a Perfect $4^{th}$. The Major $6^{th}$ Chord Dial, comprised of a Major $3^{rd}$, a Minor $3^{rd}$, a Whole Step, and a Major $3^{rd}$. The Major $7^{th}$ Chord Dial, comprised of a Major $3^{rd}$, a Minor $3^{rd}$, a Major $3^{rd}$, and a Half-Step. The Minor $7^{th}$ Chord Dial, comprised of a Minor $3^{rd}$, a Major $3^{rd}$, a Minor $3^{rd}$, and a Whole Step. The Dominant $7^{th}$ Chord Dial, comprised of a Major $3^{rd}$, a Minor $3^{rd}$, a Minor $3^{rd}$, and a Whole Step. The Suspended $7^{th}$ Chord Dial, comprised of a Perfect $4^{th}$, a Whole Step, a Minor $3^{rd}$, and a Whole Step. The Suspended $4^{th}$ Chord Dial, comprised of a Perfect $4^{th}$, a Whole Step, and a Perfect $4^{th}$. The Minor $6^{th}$ Chord Dial, comprised of a Minor $3^{rd}$, a Major $3^{rd}$, a Whole Step, and a Minor $3^{rd}$.

To find the notes of a particular chord, the musician places the front of the Chordteacher either under the strings of a guitar, or else on a piano-type keyboard, lining up the printed notes with the corresponding notes of the instrument. The musician then rotates the appropriate chord dial so that the root aligns on the note of the desired chord. The 30 degree clear wedges of the transparent chord dials reveal which notes to play for that particular chord. Then the notes are at the musician's fingertips on the instrument.

On the back of the Chordteacher is the Diatonic Octave Dial, which shows the musician the Major Scale of any particular key signature. The musician simply chooses a key signature, and rotates the Diatonic Octave Dial so that the 30 degree clear wedge labeled Do (I) points towards the key signature. The key note of the key signature is revealed under the words Do (I), and is the starting note of the Major Octave in question. From that note, a quick glance clockwise around the Diatonic Octave Dial shows each note of the Diatonic Octave, or Major Scale, in this order—Do (I) Major, Re (II) Minor, Mi (III) Minor, Fa (IV) Major, Sol (V) Major, La (VI) Minor, Ti (VII) Diminished, back to Do (VIII) Major.

Across the top back of the Chordteacher is once again the printed replica of a 6-stringed guitar fret board, comprising of 6 horizontal color-coded lines representing the 6 strings of a guitar, and 18 vertical lines representing the 18 frets. Each fret is numbered 1-18. All of the chromatic notes are color-coded and labeled at the intersections of the strings and frets.

Across the bottom back of the Chordteacher is once again the printed replica of a piano-type musical keyboard with all of the chromatic notes color-coded and labeled. Above each piano key is printed the corresponding note of the Willoughby Scale.

BRIEF DESCRIPTION OF THE DRAWINGS

FIG. 1 provides a purely schematic front view of the invention being held under the strings of a guitar by a guitarist, any markings and subfeatures of the Chordteacher illustrated are merely schematic and are not intended to be clearly legible, but only to provide a general impression of the apparatus and the positioning of such markings and subfeatures, with the more detailed views that follow in subsequent drawings providing a more detailed and legible view of such markings and subfeatures.

FIG. 2 provides a purely schematic back view of the invention located on a piano-type musical keyboard, any markings and subfeatures of the Chordteacher illustrated are merely schematic and are not intended to be clearly legible, but only to provide a general impression of the apparatus and the positioning of such markings and subfeatures, with the more detailed views that follow in subsequent drawings providing a more detailed and legible view of such markings and subfeatures.

Figure 5D:
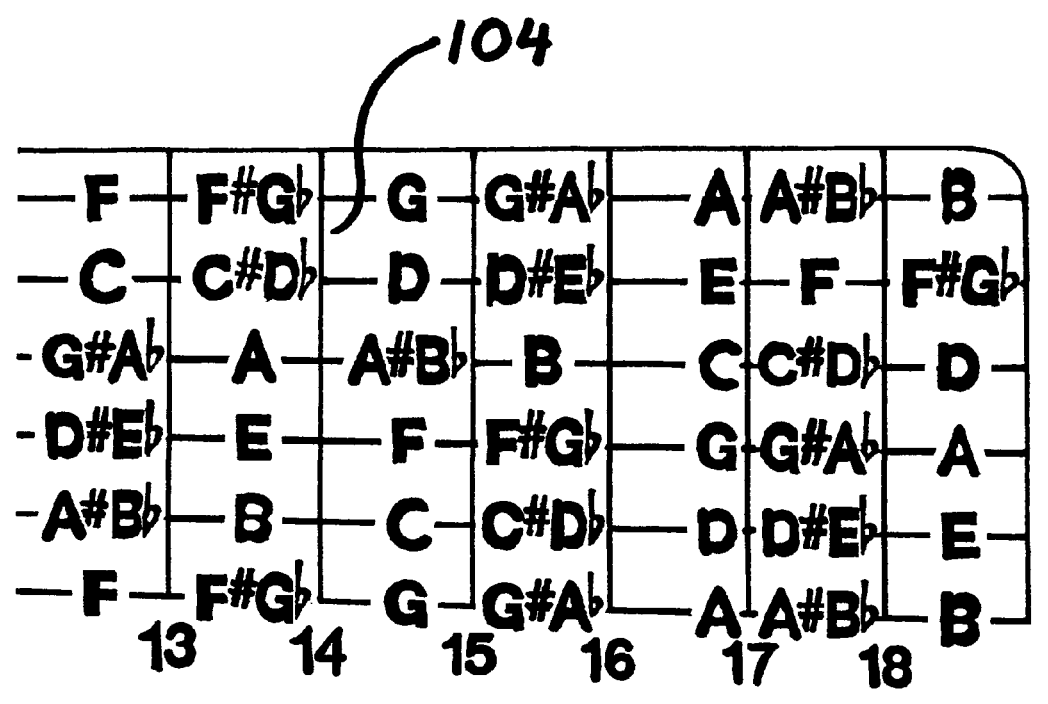

FIG. 5D is the fourth portion of a guitar fret board with strings, frets, and notes labeled.

FIG. 6 is the piano keyboard with the chromatic notes labeled along with their corresponding Willoughby Scale notes.

FIG. 24 is the top view of the fully assembled Chordteacher.

FIG. 25 is the bottom view of the fully assembled Chordteacher.

DESCRIPTION

Figure 3:
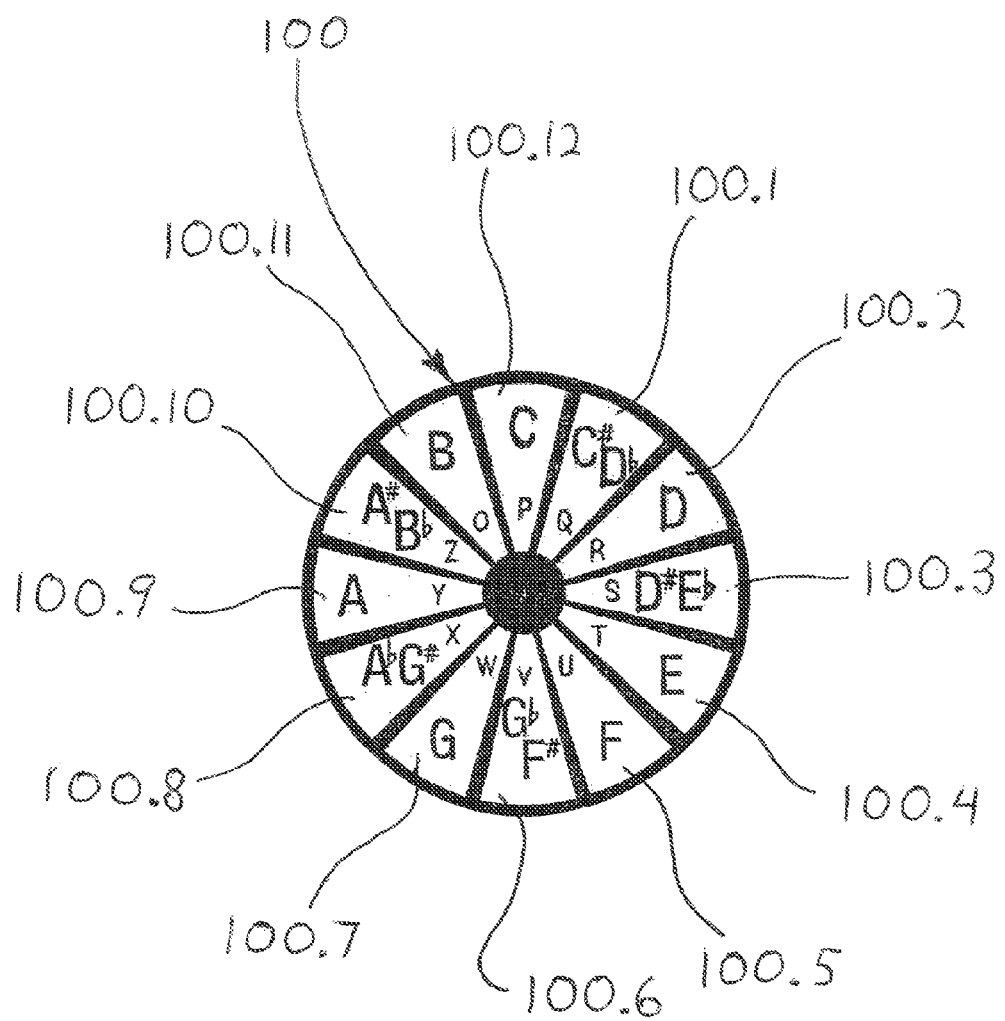
FIG. 3 is the Willoughby Scale/Chromatic Scale in a 12-piece pie shape. Each piece of the pie is a 30 degree pie-shaped wedge.

Turning now to the drawing figures, it will be seen that FIG. 1 is the front view of the Chordteacher 60F being held under the strings of a guitar or a bass guitar or other stringed instrument 62 by a guitarist 64. FIG. 2 is the back view of the Chordteacher 60B located on a piano-type musical keyboard 58 behind the black keys and lined up with the black and white notes of the piano-type musical keyboard.

FIG. 3 shows the color-coded printed indicia of the Willoughby Scale and the Chromatic Scale around it in a 12-piece pie shape. Each piece of the pie is a 30 degree pie-shaped wedge 100. In the 12 o'clock position, the 30 degree pie-shaped wedge is colored yellow with the note P of the Willoughby Scale printed on it, and also the note C of the Chromatic Scale printed on it 100.12. In the 1 o'clock position, the 30 degree pie-shaped wedge is colored yellow-orange with the note Q of the Willoughby Scale printed on it, and also the note C sharp/D flat of the Chromatic Scale printed on it 100.1. In the 2 o'clock position, the 30 degree pie-shaped wedge is colored orange with the note R of the Willoughby Scale printed on it, and also the note D of the Chromatic Scale printed on it 100.2. In the 3 o'clock position, the 30 degree pie-shaped wedge is colored red-orange with the note S of the Willoughby Scale printed on it, and also the note D sharp/E flat of the Chromatic Scale printed on it 100.3. In the 4 o'clock position, the 30 degree pie-shaped wedge is colored red with the note T of the Willoughby Scale printed on it, and also the note E of the Chromatic Scale printed on it 100.4. In the 5 o'clock position, the 30 degree pie-shaped wedge is colored red-violet with the note U of the Willoughby Scale printed on it, and also the note F of the Chromatic Scale printed on it 100.5. In the 6 o'clock position, the 30 degree pie-shaped wedge is colored violet with the note V of the Willoughby Scale printed on it, and also the note F sharp/G flat of the Chromatic Scale printed on it 100.6. In the 7 o'clock position, the 30 degree pie-shaped wedge is colored blue-violet with the note W of the Willoughby Scale printed on it, and also the note G of the Chromatic Scale printed on it 100.7. In the 8 o'clock position, the 30 degree pie-shaped wedge is colored blue with the note X of the Willoughby Scale printed on it, and also the note G sharp/A flat of the Chromatic Scale printed on it 100.8. In the 9 o'clock position, the 30 degree pie-shaped wedge is colored blue-green with the note Y of the Willoughby Scale printed on it, and also the note A of the Chromatic Scale printed on it 100.9. In the 10 o'clock position, the 30 degree pie-shaped wedge is colored green with the note Z of the Willoughby Scale printed on it, and also the note A sharp/B flat of the Chromatic Scale printed on it 100.10. In the 11 o'clock position, the 30 degree pie-shaped wedge is colored yellow-green with the note O of the Willoughby Scale printed on it, and also the note B of the Chromatic Scale printed on it 100.11.

Figure 4:
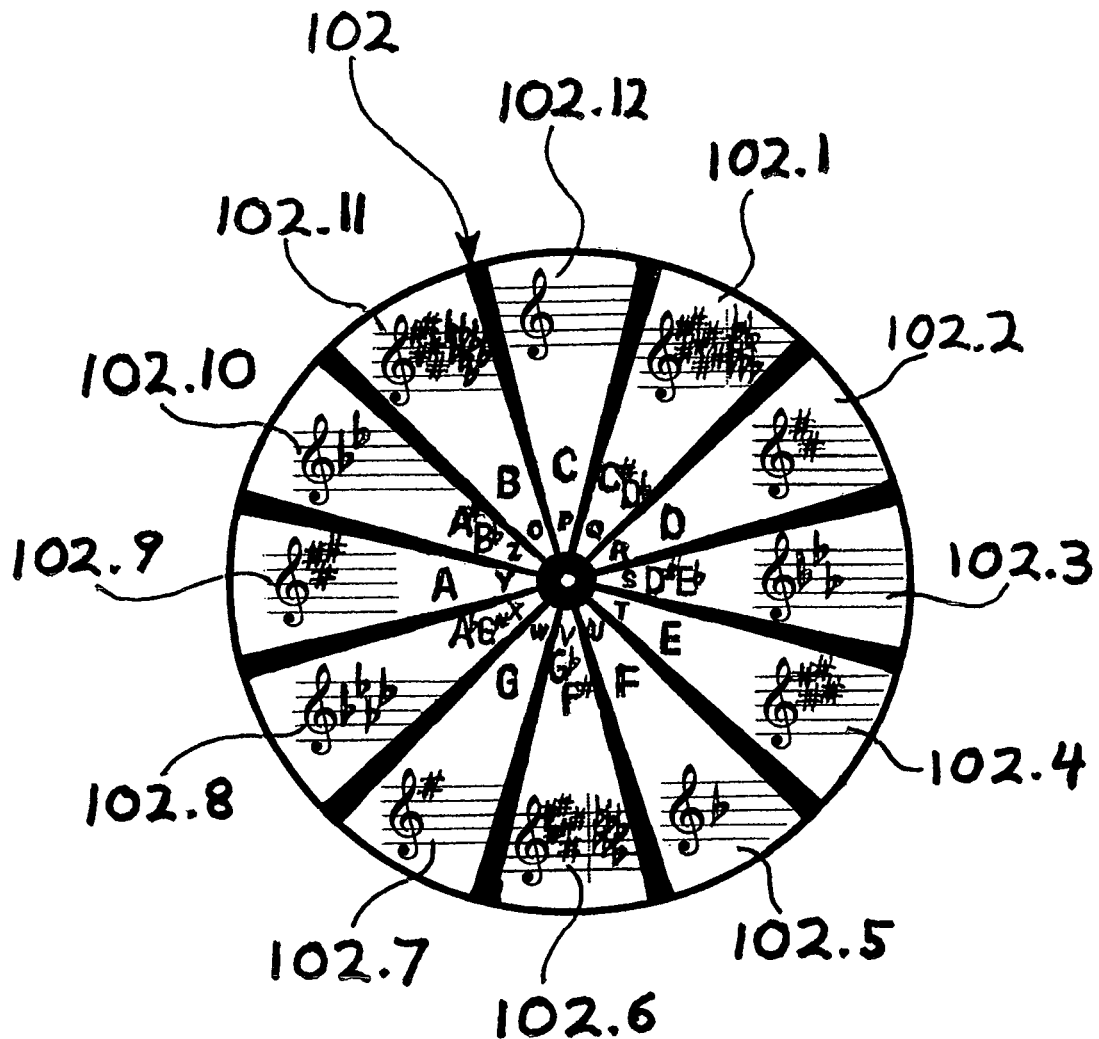
FIG. 4 is the Willoughby Scale/Chromatic Scale with key signatures in a 12-piece pie shape. Each piece of the pie is a 30 degree pie-shaped wedge.
Figure 5A:
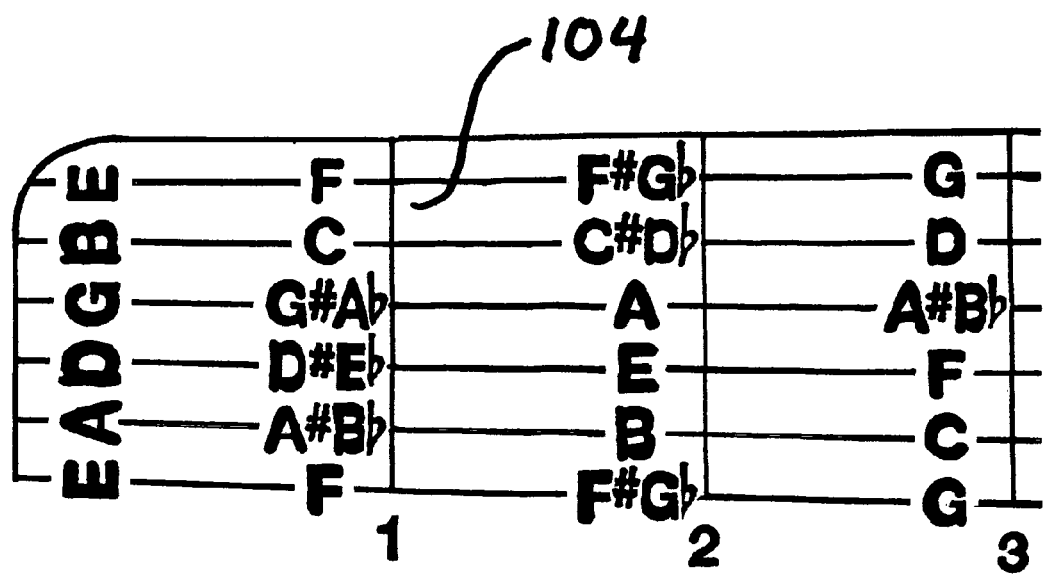
FIG. 5A is the first portion of a guitar fret board with strings, frets, and notes labeled.
Figure 5B:
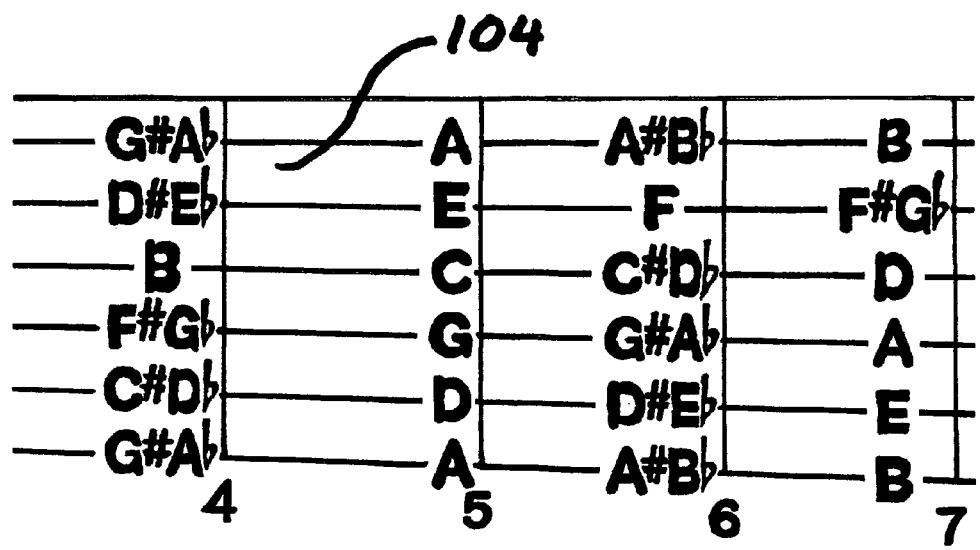
FIG. 5B is the second portion of a guitar fret board with strings, frets, and notes labeled.
Figure 5C:
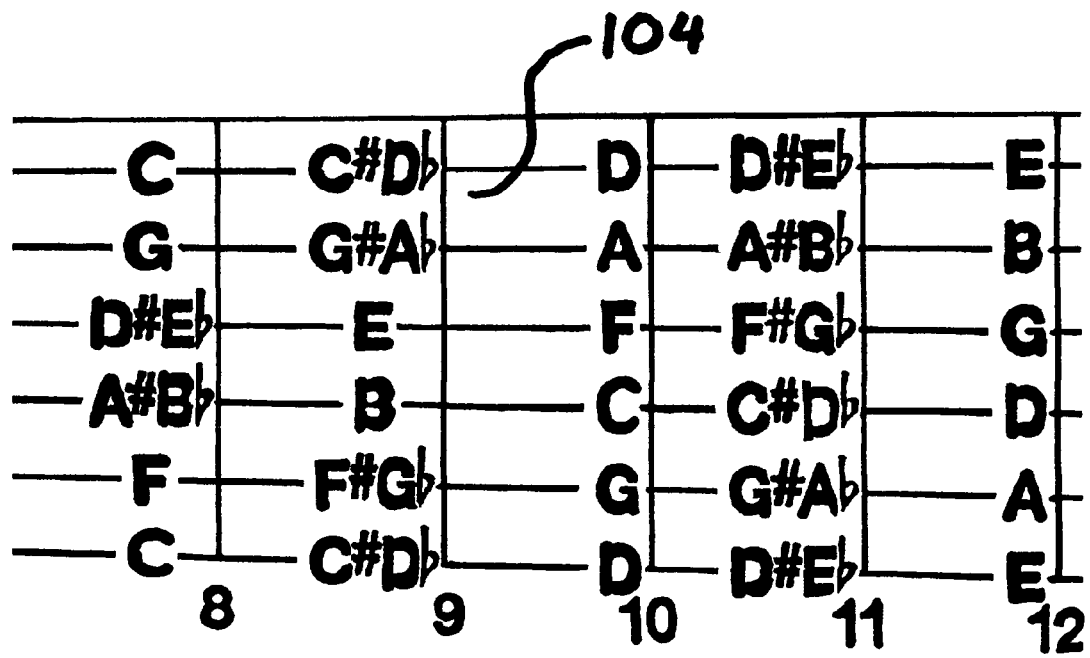
FIG. 5C is the third portion of a guitar fret board with strings, frets, and notes labeled.

FIG. 4 shows the key signatures of Western Music around the color-coded printed indicia of the Willoughby Scale and the Chromatic Scale around it in a 12-piece pie shape. Each piece of the pie is a 30 degree pie-shaped wedge 102. In the 12 o'clock position, the 30 degree pie-shaped wedge is colored yellow with the note P of the Willoughby Scale printed on it, and also the note C of the Chromatic Scale printed on it. This position also includes the staves showing the key signature of C, with no sharps and no flats 102.12. In the 1 o'clock position, the 30 degree pie-shaped wedge is colored yellow-orange with the note Q of the Willoughby Scale printed on it, and also the note C sharp/D flat of the Chromatic Scale printed on it. This position also includes the staves showing the key signature of C sharp, with 7 sharps and the key signature of D flat with 5 flats 102.1. In the 2 o'clock position, the 30 degree pie-shaped wedge is colored orange with the note R of the Willoughby Scale printed on it, and also the note D of the Chromatic Scale printed on it. This position also includes the staves showing the key signature of D, with 2 sharps 102.2. In the 3 o'clock position, the 30 degree pie-shaped wedge is colored red-orange with the note S of the Willoughby Scale printed on it, and also the note D sharp/E flat of the Chromatic Scale printed on it. This position also includes the staves showing the key signature of E flat, with 3 flats 102.3. In the 4 o'clock position, the 30 degree pie-shaped wedge is colored red with the note T of the Willoughby Scale printed on it, and also the note E of the Chromatic Scale printed on it. This position also includes the staves showing the key signature of E, with 4 sharps 102.4. In the 5 o'clock position, the 30 degree pie-shaped wedge is colored red-violet with the note U of the Willoughby Scale printed on it, and also the note F of the Chromatic Scale printed on it. This position also includes the staves showing the key signature of F, with 1 flat 102.5. In the 6 o'clock position, the 30 degree pie-shaped wedge is colored violet with the note V of the Willoughby Scale printed on it, and also the note F sharp/G flat of the Chromatic Scale printed on it. This position also includes the staves showing the key signature of F sharp with 6 sharps, and also G flat with 6 flats 102.6. In the 7 o'clock position, the 30 degree pie-shaped wedge is colored blue-violet with the note W of the Willoughby Scale printed on it, and also the note G of the Chromatic Scale printed on it. This position also includes the staves showing the key signature of G, with 1 sharp 102.7. In the 8 o'clock position, the 30 degree pie-shaped wedge is colored blue with the note X of the Willoughby Scale printed on it, and also the note G sharp/A flat of the Chromatic Scale printed on it. This position also includes the staves showing the key signature of A flat, with 4 flats 102.8. In the 9 o'clock position, the 30 degree pie-shaped wedge is colored blue-green with the note Y of the Willoughby Scale printed on it, and also the note A of the Chromatic Scale printed on it. This position also includes the staves showing the key signature of A, with 3 sharps 102.9. In the 10 o'clock position, the 30 degree pie-shaped wedge is colored green with the note Z of the Willoughby Scale printed on it, and also the note A sharp/B flat of the Chromatic Scale printed on it. This position also includes the staves showing the key signature of B flat, with 2 flats 102.10. In the 11 o'clock position, the 30 degree pie-shaped wedge is colored yellow-green with the note O of the Willoughby Scale printed on it, and also the note B of the Chromatic Scale printed on it. This position also includes the staves showing the key signature of B, with 5 sharps, and also C flat, with 7 flats 102.11.

FIGS. 5A through 5D provide a printed replica of a 6-stringed guitar with 18 frets, comprising of 6 horizontal color-coded lines representing the 6 strings of a guitar, and 18 vertical lines representing the 18 frets. Each fret is numbered 1-18. All of the chromatic notes are color-coded and labeled at the intersections of the strings and frets 104.

Figure 6:
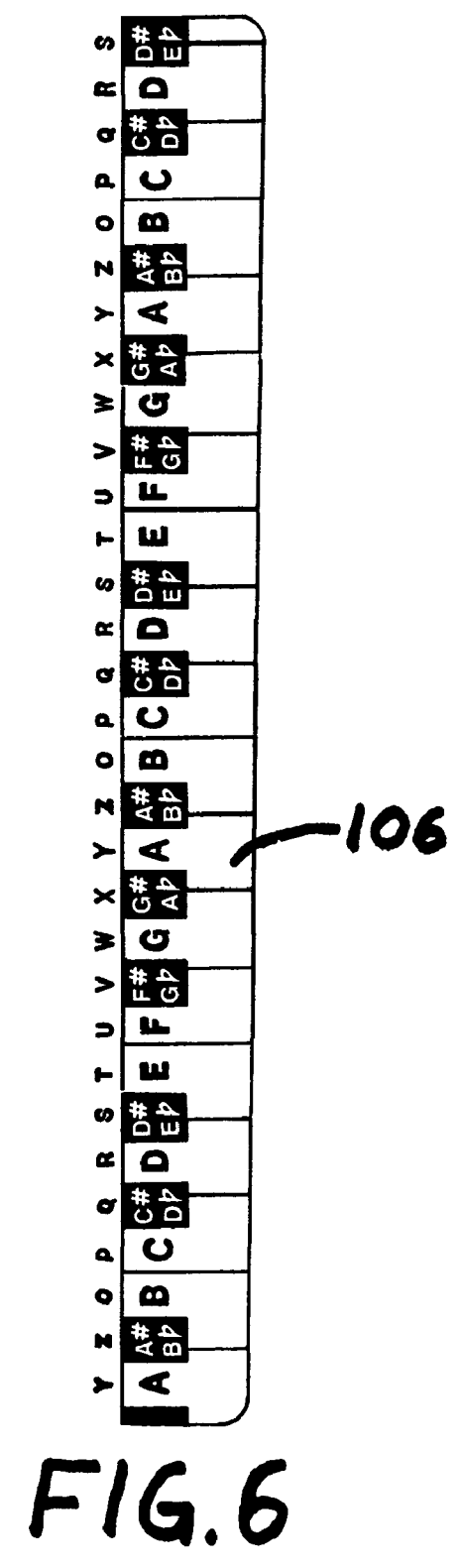

FIG. 6 is the printed replica of a piano-type musical keyboard with all of the chromatic notes color-coded and labeled according to the notes. Above each chromatic note are the notes of the Willoughby Scale printed above each and every black and white note on the piano-type musical keyboard 106.

Figure 7:
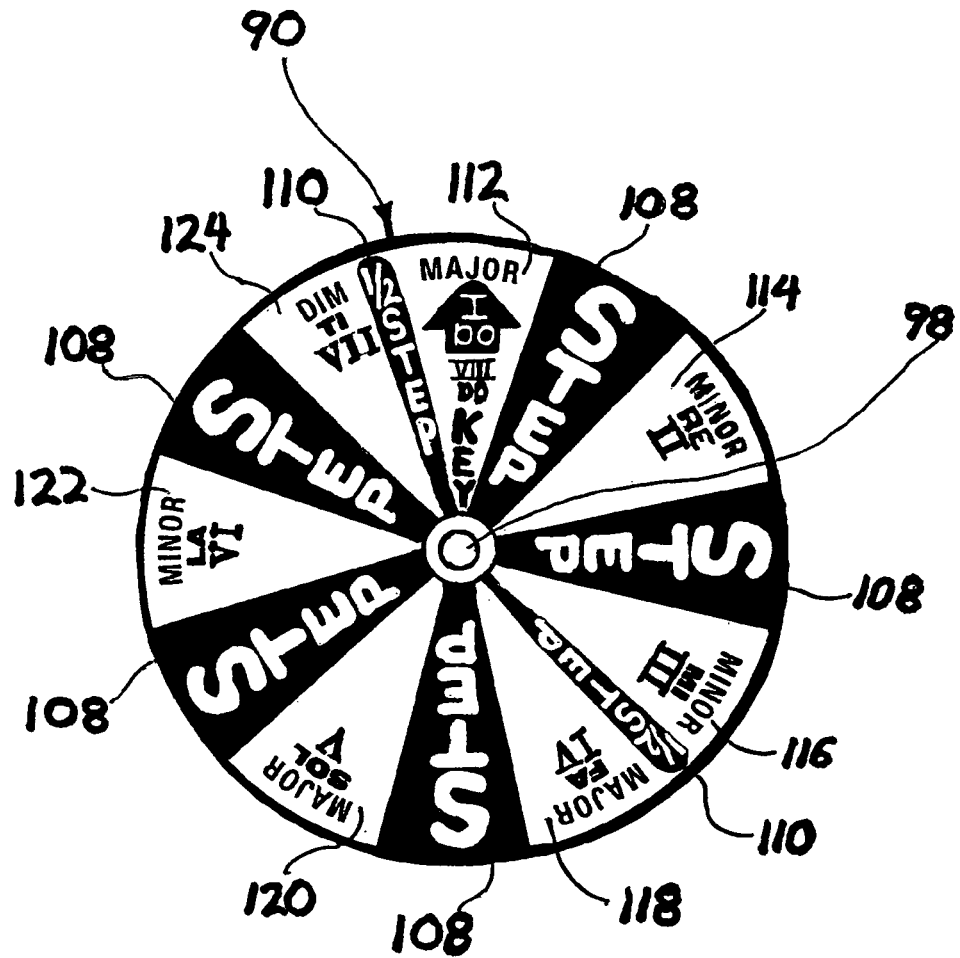
FIG. 7 is the Diatonic Octave Dial.

FIG. 7 is the Diatonic Octave Dial 90 with a Dial Pivot Hole 98 centered in the dial. In the 12 o'clock position is the clear 30 degree pie-shaped wedge with the words KEY, DO, VIII, DO, I, and MAJOR 112. In the 1 o'clock position is the opaque 30 degree pie-shaped wedge with the word STEP 108. In the 2 o'clock position is the clear 30 degree pie-shaped wedge with the words II, RE, and MINOR 114. In the 3 o'clock position is the opaque 30 degree pie-shaped wedge with the word STEP 108. In the 4 o'clock position is the clear 30 degree pie-shaped wedge with the words III, MI, and MINOR 116. In the 4:30 position is the Half-step, the gap between two clear wedges 110. In the 5 o'clock position is the clear 30 degree pie-shaped wedge with the words IV, FA, and MAJOR 118. In the 6 o'clock position is the opaque 30 degree pie-shaped wedge with the word STEP 108. In the 7 o'clock position is the clear 30 degree pie-shaped wedge with the words V, SOL, and MAJOR 120. In the 8 o'clock position is the opaque 30 degree pie-shaped wedge with the word STEP 108. In the 9 o'clock position is the clear 30 degree pie-shaped wedge with the words R.M. (the starting point of the Relative Minor Mode), VI, LA, and MINOR 122. In the 10 o'clock position is the opaque 30 degree pie-shaped wedge with the word STEP 108. In the 11 o'clock position is the clear 30 degree pie-shaped wedge with the words VII, TI, and DIM 124. In the 11:30 position is the Half-step, the gap between two clear wedges 110.

Figure 8:
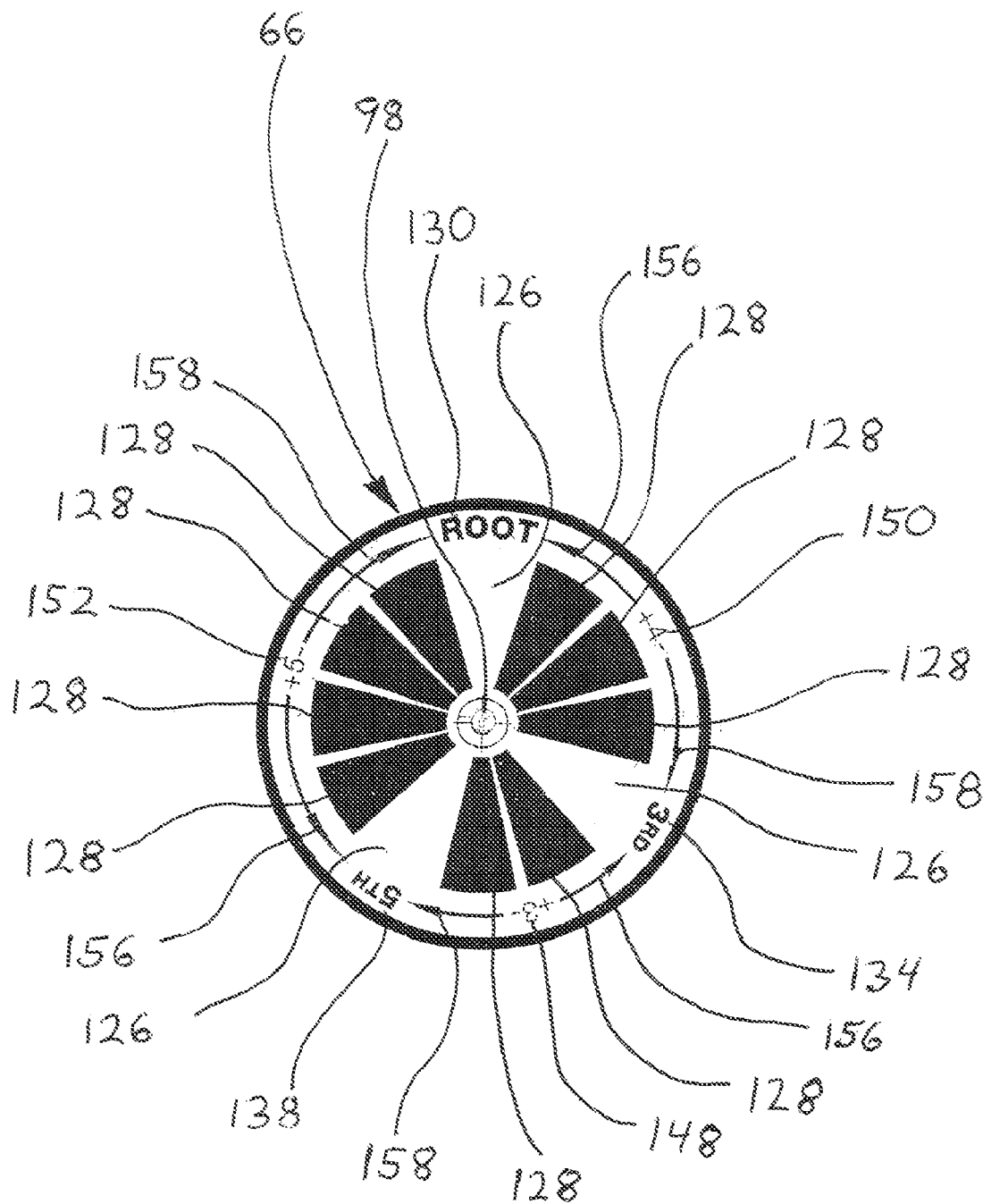
FIG. 8 is the Major Chord Dial.

FIG. 8 shows the transparent Major chord Dial 66, with the Dial Pivot Hole 98 in the center. In the 12 o'clock position is the clear 30 degree pie-shaped wedge 126, and the word Root: the lowest note of a chord in its fundamental position 130. In the 1 o'clock position is the opaque 30 degree pie-shaped wedge 128, and the Counter-clockwise Arrow 156. In the 2 o'clock position is the Opaque 30 degree pie-shaped wedge 128, and the Major Third (+4−), separated by 4 Half-Steps 150. In the 3 o'clock position is the Opaque 30 degree pie-shaped wedge 128, and the Clockwise Arrow 158. In the 4 o'clock position is the Clear 30 degree pie-shaped wedge 126, and the word $3^{rd}$ the third degree of the Major Diatonic Scale 134. In the 5 o'clock position is the Opaque 30 degree pie-shaped wedge 128, and the Counter-clockwise Arrow 156. In the 5:30 Position is the Minor Third (+3−), separated by 3 Half-Steps 148. In the 6 o'clock position is the Opaque 30 degree pie-shaped wedge 128, and the Clockwise Arrow 158. In the 7 o'clock position is the Clear 30 degree pie-shaped wedge 126, and the word $5^{th}$ the fifth degree of the Major Diatonic Scale 138. In the 8 o'clock position is the Opaque 30 degree pie-shaped wedge 128, and the Counter-clockwise Arrow 156. In the 9 o'clock position is the Opaque 30 degree pie-shaped wedge 128. In the 9:30 position is the Perfect Fourth (+5−), separated by 5 Half-Steps 152. In the 10 o'clock position is the Opaque 30 degree pie-shaped wedge 128. In the 11 o'clock position is the Opaque 30 degree pie-shaped wedge 128, and the Clockwise Arrow 158.

Figure 9:
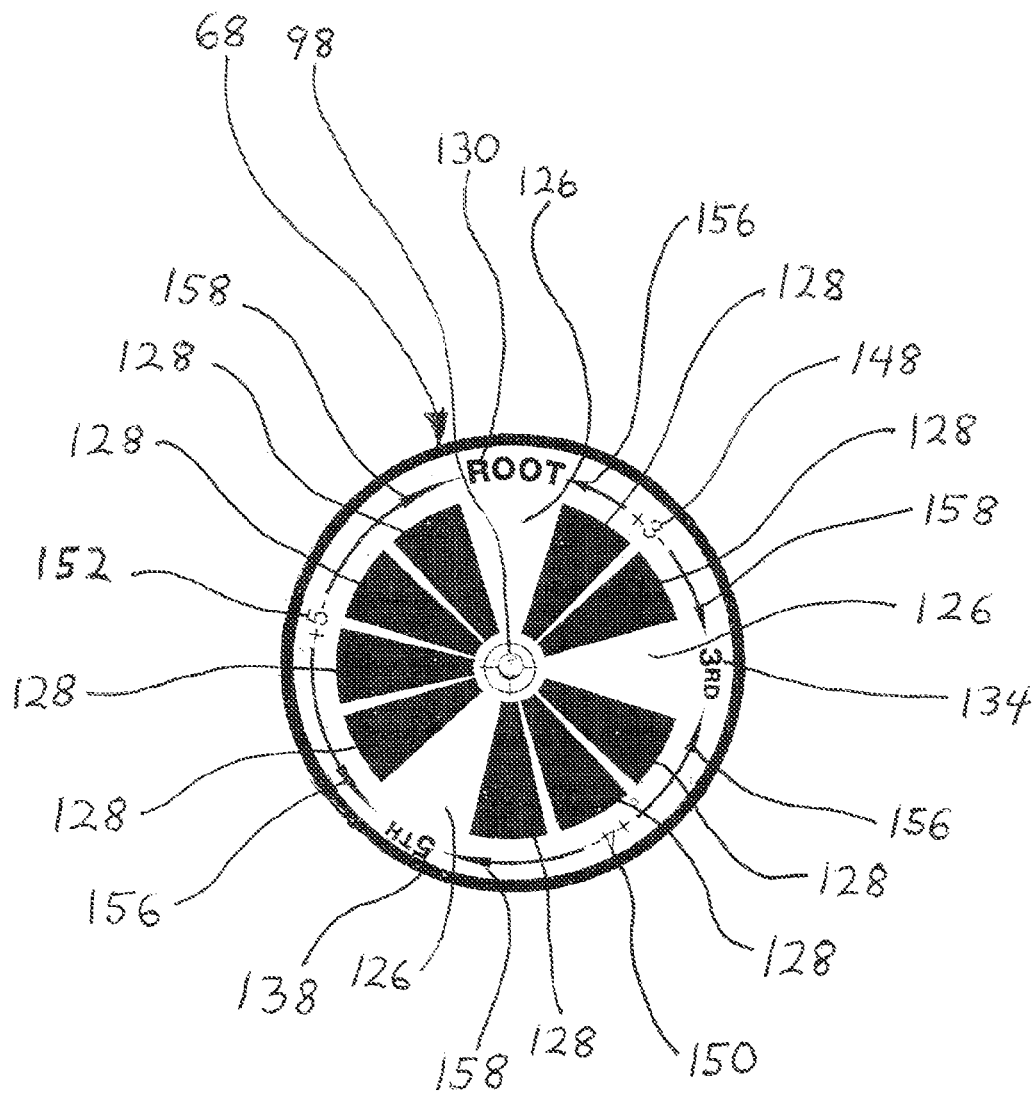
FIG. 9 is the Minor Chord Dial.

FIG. 9 shows the transparent Minor chord Dial 68, with the Dial Pivot Hole 98 in the center. In the 12 o'clock position is the Clear 30 degree pie-shaped wedge 126, and the word Root: the lowest note of a chord in its fundamental position 130. In the 1 o'clock position is the Opaque 30 degree pie-shaped wedge 128, and the Counter-clockwise Arrow 156. In the 1:30 Position is the Minor Third (+3−), separated by 3 Half-Steps 148. In the 2 o'clock position is the Opaque 30 degree pie-shaped wedge 128, and the Clockwise Arrow 158. In the 3 o'clock position is the Clear 30 degree pie-shaped wedge 126, and the word $3^{rd}$ the third degree of the Major Diatonic Scale 134. In the 4 o'clock position is the Opaque 30 degree pie-shaped wedge 128, and the Counter-clockwise Arrow 156. In the 5 o'clock position is the Opaque 30 degree pie-shaped wedge 128, and the Major Third (+4−), separated by 4 Half-Steps 150. In the 6 o'clock position is the Opaque 30 degree pie-shaped wedge 128, and the Clockwise Arrow 158. In the 7 o'clock position is the Clear 30 degree pie-shaped wedge 126, and the word $5^{th}$ the fifth degree of the Major Diatonic Scale 138. In the 8 o'clock position is the Opaque 30 degree pie-shaped wedge 128, and the Counter-clockwise Arrow 156. In the 9 o'clock position is the Opaque 30 degree pie-shaped wedge 128. In the 9:30 Position is the Perfect Fourth (+5−), separated by 5 Half-Steps 152. In the 10 o'clock position is the Opaque 30 degree pie-shaped wedge 128. In the 11 o'clock position is the Opaque 30 degree pie-shaped wedge 128, and the Clockwise Arrow 158.

Figure 10:
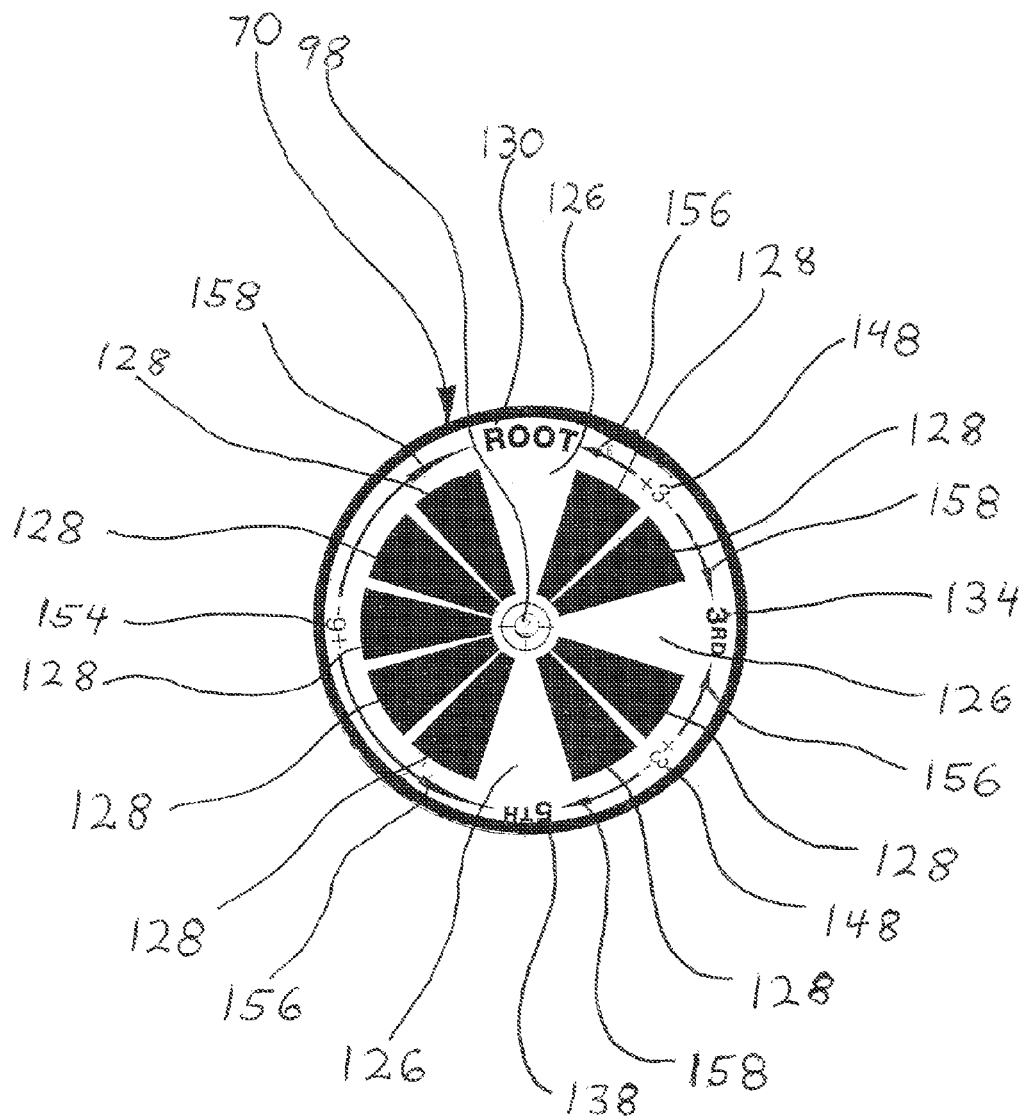
FIG. 10 is the Diminished Chord Dial.

FIG. 10 shows the transparent Diminished chord Dial 70, with the Dial Pivot Hole 98 in the center. In the 12 o'clock position is the Clear 30 degree pie-shaped wedge 126, and the word Root: the lowest note of a chord in its fundamental position 130. In the 1 o'clock position is the Opaque 30 degree pie-shaped wedge 128, and the Counter-clockwise Arrow 156. In the 1:30 Position is the Minor Third (+3−), separated by 3 Half-Steps 148. In the 2 o'clock position is the Opaque 30 degree pie-shaped wedge 128, and the Clockwise Arrow 158. In the 3 o'clock position is the Clear 30 degree pie-shaped wedge 126, and the word $3^{rd}$ the third degree of the Major Diatonic Scale 134. In the 4 o'clock position is the Opaque 30 degree pie-shaped wedge 128, and the Counter-clockwise Arrow 156. In the 4:30 Position is the Minor Third (+3−), separated by 3 Half-Steps 148. In the 5 o'clock position is the Opaque 30 degree pie-shaped wedge 128, and the Clockwise Arrow 158. In the 6 o'clock position is the Clear 30 degree pie-shaped wedge 126, and the word $5^{th}$ the fifth degree of the Major Diatonic Scale 138. In the 7 o'clock position is the Opaque 30 degree pie-shaped wedge 128, and the Counter-clockwise Arrow 156. In the 8 o'clock position is the Opaque 30 degree pie-shaped wedge 128. In the 9 o'clock position is the Opaque 30 degree pie-shaped wedge 128, and the Tritone (+6−), separated by 6 Half-Steps 154. In the 10 o'clock position is the Opaque 30 degree pie-shaped wedge 128, In the 11 o'clock position is the Opaque 30 degree pie-shaped wedge 128, and the Clockwise Arrow 158.

Figure 11:
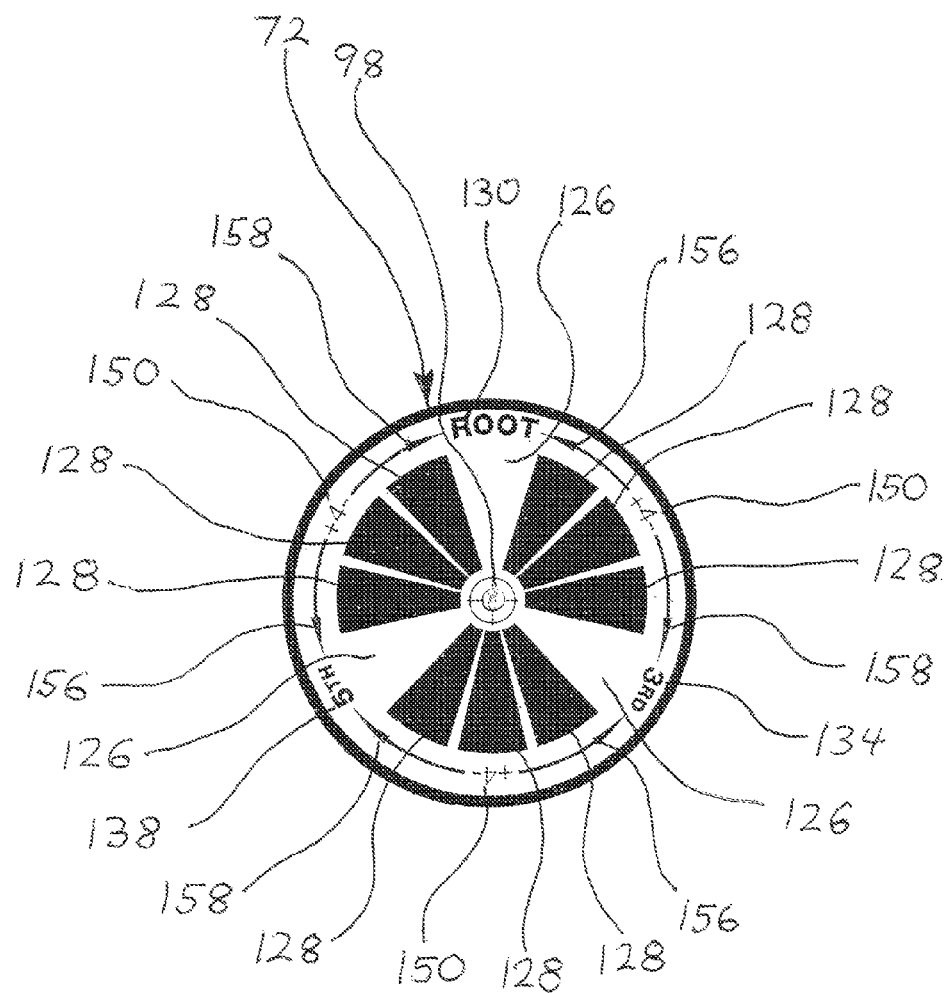
FIG. 11 is the Augmented Chord Dial.

FIG. 11 shows the transparent Augmented chord Dial 72, with the Dial Pivot Hole 98 in the center. In the 12 o'clock position is the Clear 30 degree pie-shaped wedge 126, and the word Root: the lowest note of a chord in its fundamental position 130. In the 1 o'clock position is the Opaque 30 degree pie-shaped wedge 128, and the Counter-clockwise Arrow 156. In the 2 o'clock position is the Opaque 30 degree pie-shaped wedge 128, and the Major Third (+4−), separated by 4 Half-Steps 150. In the 3 o'clock position is the Opaque 30 degree pie-shaped wedge 128, and the Clockwise Arrow 158. In the 4 o'clock position is the Clear 30 degree pie-shaped wedge 126, and the word $3^{rd}$ the third degree of the Major Diatonic Scale 134. In the 5 o'clock position is the Opaque 30 degree pie-shaped wedge 128, and the Counter-clockwise Arrow 156. In the 6 o'clock position is the Opaque 30 degree pie-shaped wedge 128, and the Major Third (+4−), separated by 4 Half-Steps 150. In the 7 o'clock position is the Opaque 30 degree pie-shaped wedge 128, and the Clockwise Arrow 158. In the 8 o'clock position is the Clear 30 degree pie-shaped wedge 126, and the word $5^{th}$ the fifth degree of the Major Diatonic Scale 138. In the 9 o'clock position is the Opaque 30 degree pie-shaped wedge 128, and the Counter-clockwise Arrow 156. In the 10 o'clock position is the Opaque 30 degree pie-shaped wedge 128, and the Major Third (+4−), separated by 4 Half-Steps 150. In the 11 o'clock position is the Opaque 30 degree pie-shaped wedge 128, and the Clockwise Arrow 158.

Figure 12:
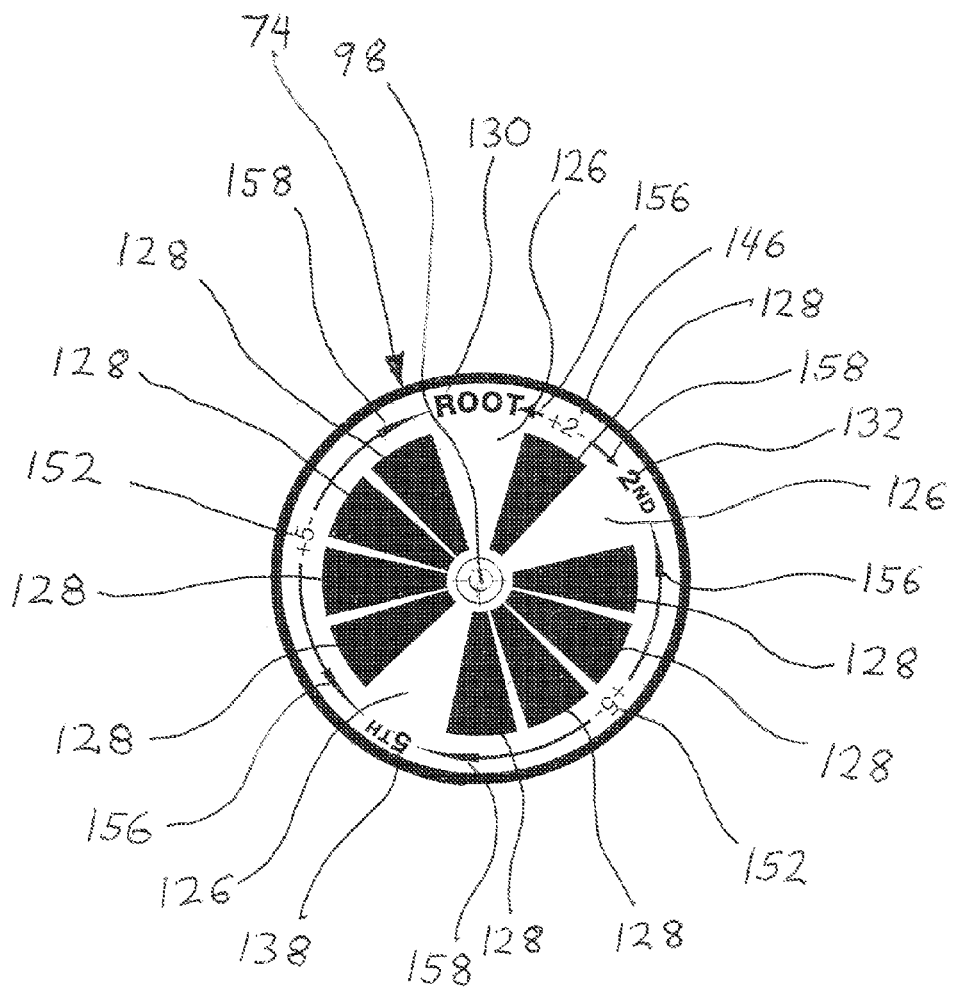
FIG. 12 is the Suspended $2^{nd}$ Chord Dial.

FIG. 12 shows the transparent Suspended $2^{nd}$ chord Dial 74, with the Dial Pivot Hole 98 in the center. In the 12 o'clock position is the Clear 30 degree pie-shaped wedge 126, and the word Root: the lowest note of a chord in its fundamental position 130. In the 1 o'clock position is the Opaque 30 degree pie-shaped wedge 128, and the Counter-clockwise Arrow 156, and the Whole-Step (+2−), separated by 2 Half-Steps 146, and the Clockwise Arrow 158. In the 2 o'clock position is the Clear 30 degree pie-shaped wedge 126, and the word $2^{nd}$ the second degree of the Major Diatonic Scale 132. In the 3 o'clock position is the Opaque 30 degree pie-shaped wedge 128, and the Counter-clockwise Arrow 156. In the 4 o'clock position is the Opaque 30 degree pie-shaped wedge 128. In the 4:30 Position is the Perfect Fourth (+5−), separated by 5 Half-Steps 152. In the 5 o'clock position is the Opaque 30 degree pie-shaped wedge 128. In the 6 o'clock position is the Opaque 30 degree pie-shaped wedge 128, and the Clockwise Arrow 158. In the 7 o'clock position is the Clear 30 degree pie-shaped wedge 126, and the word $5^{th}$ the fifth degree of the Major Diatonic Scale 138. In the 8 o'clock position is the Opaque 30 degree pie-shaped wedge 128, and the Counter-clockwise Arrow 156. In the 9 o'clock position is the Opaque 30 degree pie-shaped wedge 128. In the 9:30 Position is the Perfect Fourth (+5−), separated by 5 Half-Steps 152. In the 10 o'clock position is the Opaque 30 degree pie-shaped wedge 128. In the 11 o'clock position is the Opaque 30 degree pie-shaped wedge 128, and the Clockwise Arrow 158.

Figure 13:
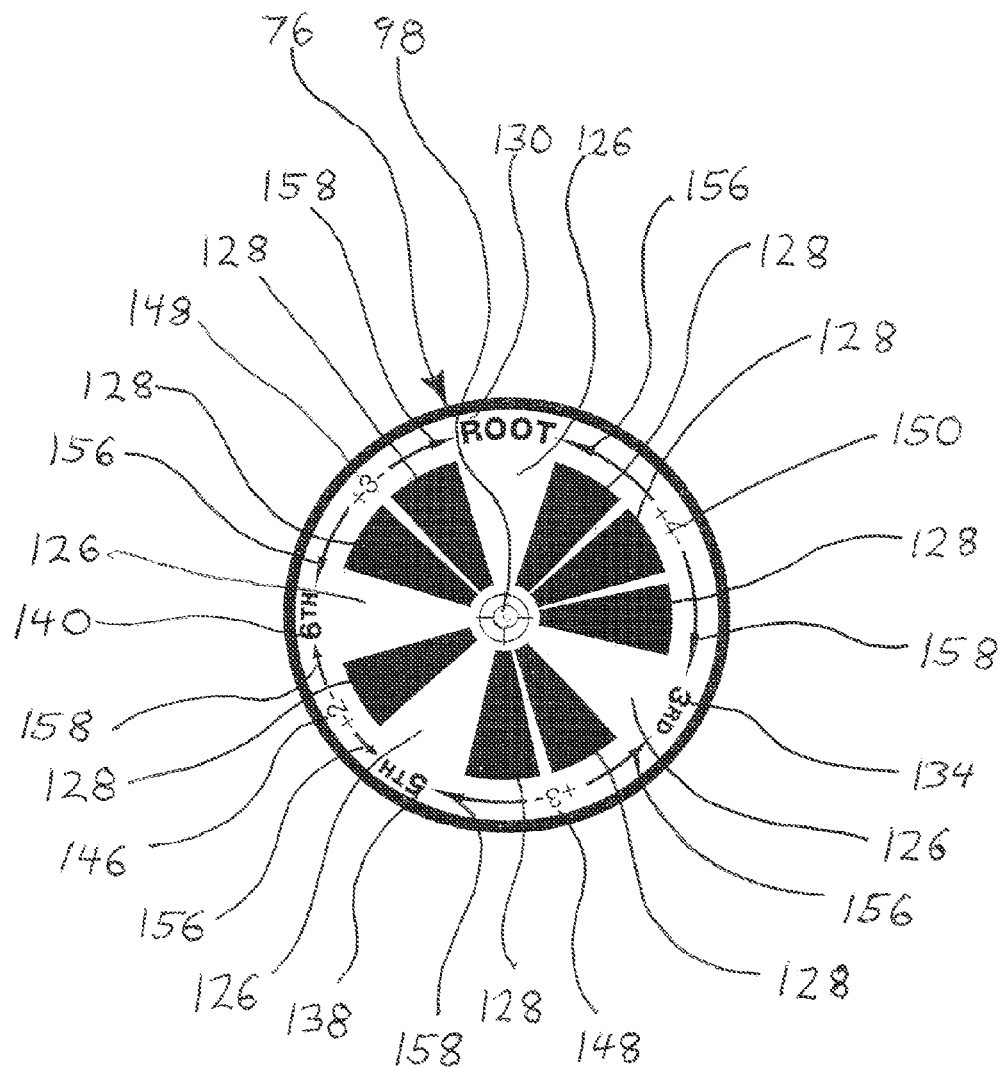
FIG. 13 is the Major $6^{th}$ Chord Dial.

FIG. 13 shows the transparent Major $6^{th}$ chord Dial 76, with the Dial Pivot Hole 98 in the center. In the 12 o'clock position is the Clear 30 degree pie-shaped wedge 126, and the word Root: the lowest note of a chord in its fundamental position 130. In the 1 o'clock position is the Opaque 30 degree pie-shaped wedge 128, and the Counter-clockwise Arrow 156. In the 2 o'clock position is the Opaque 30 degree pie-shaped wedge 128, and the Major Third (+4−), separated by 4 Half-Steps 150. In the 3 o'clock position is the Opaque 30 degree pie-shaped wedge 128, and the Clockwise Arrow 158. In the 4 o'clock position is the Clear 30 degree pie-shaped wedge 126, and the word $3^{rd}$ the third degree of the Major Diatonic Scale 134. In the 5 o'clock position is the Opaque 30 degree pie-shaped wedge 128, and the Counter-clockwise Arrow 156. In the 5:30 Position is the Minor Third (+3−), separated by 3 Half-Steps 148. In the 6 o'clock position is the Opaque 30 degree pie-shaped wedge 128, and the Clockwise Arrow 158. In the 7 o'clock position is the Clear 30 degree pie-shaped wedge 126, and the word $5^{th}$ the fifth degree of the Major Diatonic Scale 138. In the 8 o'clock position is the Opaque 30 degree pie-shaped wedge 128, and the Counter-clockwise Arrow 156, and the Whole-Step (+2−), separated by 2 Half-Steps 146, and the Clockwise Arrow 158. In the 9 o'clock position is the Clear 30 degree pie-shaped wedge 126, and the word $6^{th}$ the sixth degree of the Major Diatonic Scale 140. In the 10 o'clock position is the Opaque 30 degree pie-shaped wedge 128, and the Counter-clockwise Arrow 156. In the 10:30 Position is the Minor Third (+3−), separated by 3 Half-Steps 148. In the 11 o'clock position is the Opaque 30 degree pie-shaped wedge 128, and the Clockwise Arrow 158.

Figure 14:
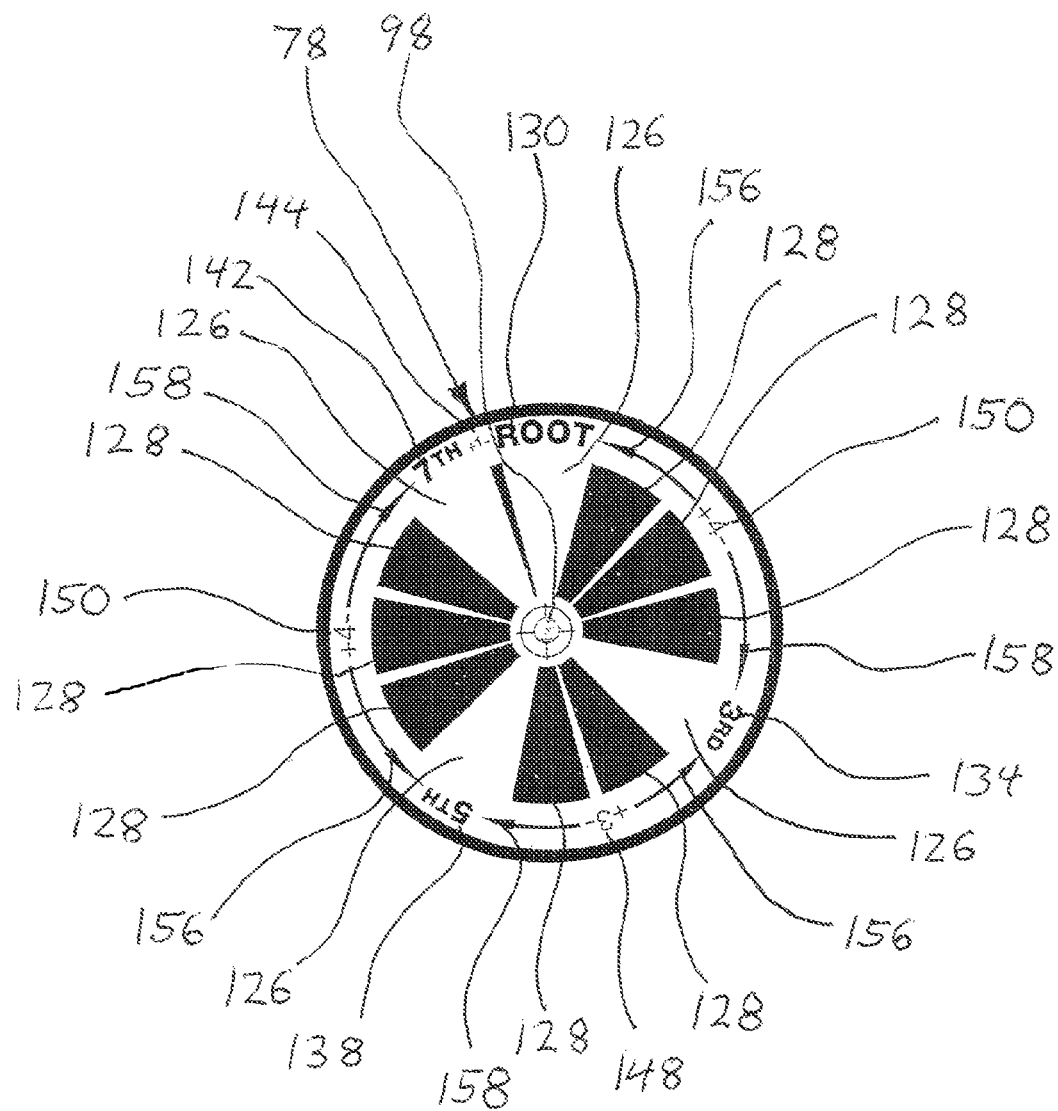
FIG. 14 is the Major $7^{th}$ Chord Dial.

FIG. 14 shows the transparent Major $7^{th}$ chord Dial 78, with the Dial Pivot Hole 98 in the center. In the 12 o'clock position is the Clear 30 degree pie-shaped wedge 126, and the word Root: the lowest note of a chord in its fundamental position 130. In the 1 o'clock position is the Opaque 30 degree pie-shaped wedge 128, and the Counter-clockwise Arrow 156. In the 2 o'clock position is the Opaque 30 degree pie-shaped wedge 128, and the Major Third (+4−), separated by 4 Half-Steps 150. In the 3 o'clock position is the Opaque 30 degree pie-shaped wedge 128, and the Clockwise Arrow 158. In the 4 o'clock position is the Clear 30 degree pie-shaped wedge 126, and the word $3^{rd}$ the third degree of the Major Diatonic Scale 134. In the 5 o'clock position is the Opaque 30 degree pie-shaped wedge 128, and the Counter-clockwise Arrow 156. In the 5:30 Position is the Minor Third (+3−), separated by 3 Half-Steps 148. In the 6 o'clock position is the Opaque 30 degree pie-shaped wedge 128, and the Clockwise Arrow 158. In the 7 o'clock position is the Clear 30 degree pie-shaped wedge 126, and the word $5^{th}$ the fifth degree of the Major Diatonic Scale 138. In the 8 o'clock position is the Opaque 30 degree pie-shaped wedge 128, and the Counter-clockwise Arrow 156. In the 9 o'clock position is the Opaque 30 degree pie-shaped wedge 128, and the Major Third (+4−), separated by 4 Half-Steps 150. In the 10 o'clock position is the Opaque 30 degree pie-shaped wedge 128, and the Clockwise Arrow 158. In the 11 o'clock position is the Clear 30 degree pie-shaped wedge 126, and the word $7^{th}$ the seventh degree of the Major Diatonic Scale 142. In the 11:30 Position is the Half-Step (+1−), separated by 1 Half-Step 144

Figure 15:
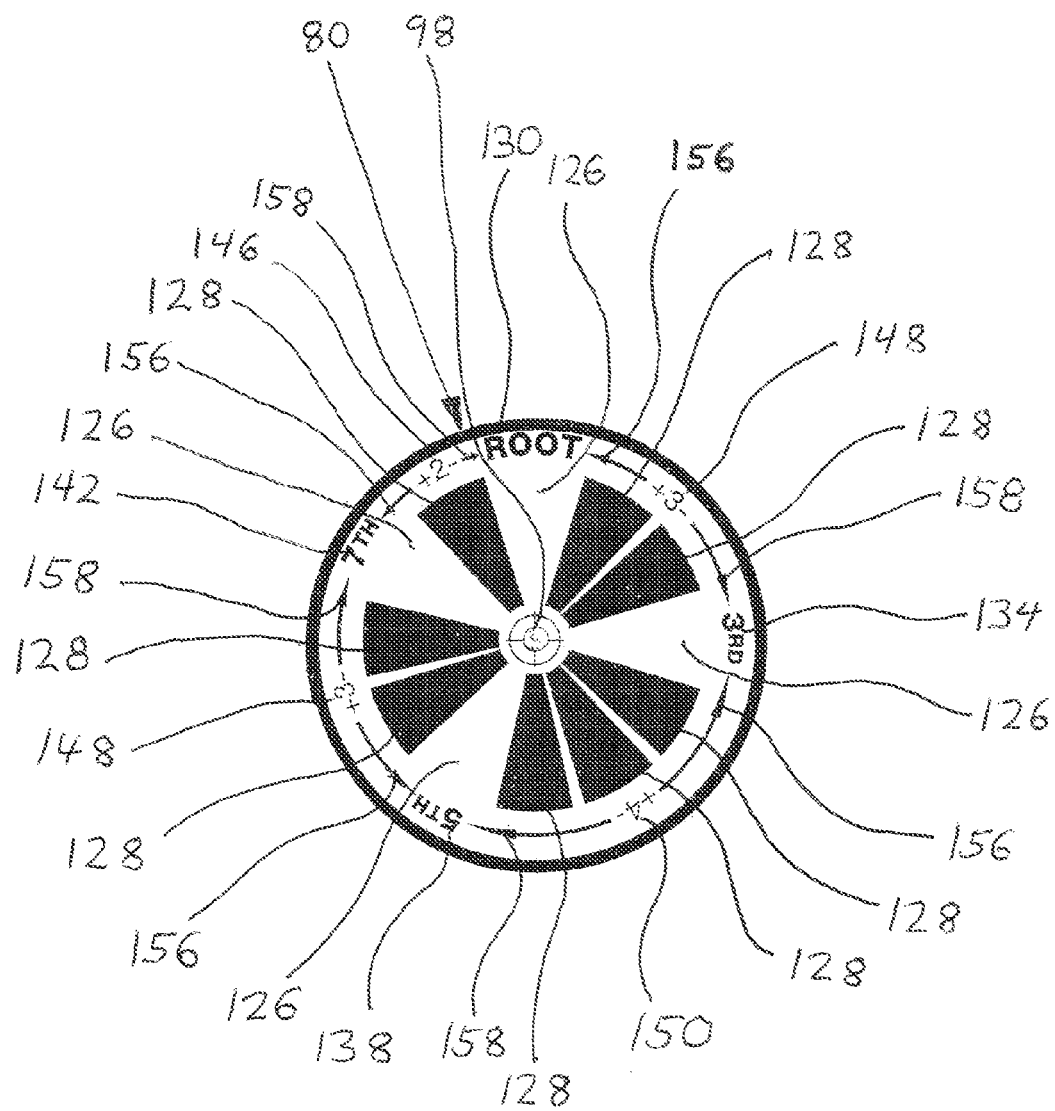
FIG. 15 is the Minor $7^{th}$ Chord Dial.

FIG. 15 shows the transparent Minor $7^{th}$ chord Dial 80, with the Dial Pivot Hole 98 in the center. In the 12 o'clock position is the Clear 30 degree pie-shaped wedge 126, and the word Root: the lowest note of a chord in its fundamental position 130. In the 1 o'clock position is the Opaque 30 degree pie-shaped wedge 128, and the Counter-clockwise Arrow 156. In the 1:30 Position is the Minor Third (+3−), separated by 3 Half-Steps 148. In the 2 o'clock position is the Opaque 30 degree pie-shaped wedge 128, and the Clockwise Arrow 158. In the 3 o'clock position is the Clear 30 degree pie-shaped wedge 126, and the word $3^{rd}$ the third degree of the Major Diatonic Scale 134. In the 4 o'clock position is the Opaque 30 degree pie-shaped wedge 128, and the Counter-clockwise Arrow 156. In the 5 o'clock position is the Opaque 30 degree pie-shaped wedge 128, and the Major Third (+4−), separated by 4 Half-Steps 150. In the 6 o'clock position is the Opaque 30 degree pie-shaped wedge 128, and the Clockwise Arrow 158. In the 7 o'clock position is the Clear 30 degree pie-shaped wedge 126, and the word 5$^{th}$ the fifth degree of the Major Diatonic Scale 138. In the 8 o'clock position is the Opaque 30 degree pie-shaped wedge 128, and the Counter-clockwise Arrow 156. In the 8:30 Position is the Minor Third (+3−), separated by 3 Half-Steps 148. In the 9 o'clock position is the Opaque 30 degree pie-shaped wedge 128, and the Clockwise Arrow 158. In the 10 o'clock position is the Clear 30 degree pie-shaped wedge 126, and the word 7$^{th}$ the seventh degree of the Major Diatonic Scale 142. In the 11 o'clock position is the Opaque 30 degree pie-shaped wedge 128, and the Counter-clockwise Arrow 156, and the Whole-Step (+2−), separated by 2 Half-Steps 146, and the Clockwise Arrow 158.

Figure 16:
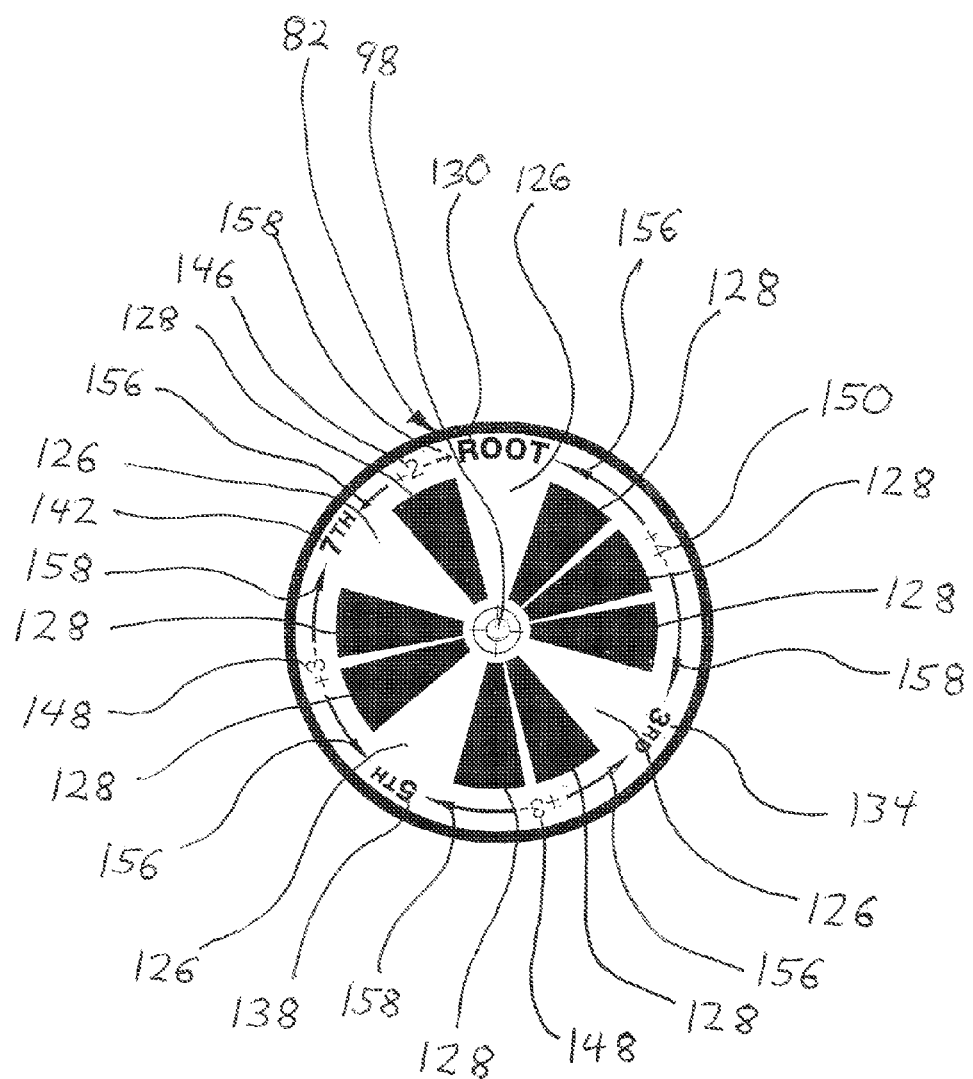
FIG. 16 is the Dominant 7<sup>th</sup> Chord Dial.

FIG. 16 shows the transparent Dominant 7$^{th}$ chord Dial 82, with the Dial Pivot Hole 98 in the center. In the 12 o'clock position is the Clear 30 degree pie-shaped wedge 126, and the word Root: the lowest note of a chord in its fundamental position 130. In the 1 o'clock position is the Opaque 30 degree pie-shaped wedge 128, and the Counter-clockwise Arrow 156. In the 2 o'clock position is the Opaque 30 degree pie-shaped wedge 128, and the Major Third (+4−), separated by 4 Half-Steps 150. In the 3 o'clock position is the Opaque 30 degree pie-shaped wedge 128, and the Clockwise Arrow 158. In the 4 o'clock position is the Clear 30 degree pie-shaped wedge 126, and the word 3$^{rd}$ the third degree of the Major Diatonic Scale 134. In the 5 o'clock position is the Opaque 30 degree pie-shaped wedge 128, and the Counter-clockwise Arrow 156. In the 5:30 Position is the Minor Third (+3−), separated by 3 Half-Steps 148. In the 6 o'clock position is the Opaque 30 degree pie-shaped wedge 128, and the Clockwise Arrow 158. In the 7 o'clock position is the Clear 30 degree pie-shaped wedge 126, and the word 5$^{th}$ the fifth degree of the Major Diatonic Scale 138. In the 8 o'clock position is the Opaque 30 degree pie-shaped wedge 128, and the Counter-clockwise Arrow 156. In the 8:30 Position is the Minor Third (+3−), separated by 3 Half-Steps 148. In the 9 o'clock position is the Opaque 30 degree pie-shaped wedge 128, and the Clockwise Arrow 158. In the 10 o'clock position is the Clear 30 degree pie-shaped wedge 126, and the word 7$^{th}$ the seventh degree of the Major Diatonic Scale 142. In the 11 o'clock position is the Opaque 30 degree pie-shaped wedge 128, and the Counter-clockwise Arrow 156, and the Whole-Step (+2−), separated by 2 Half-Steps 146, and the Clockwise Arrow 158.

Figure 17:
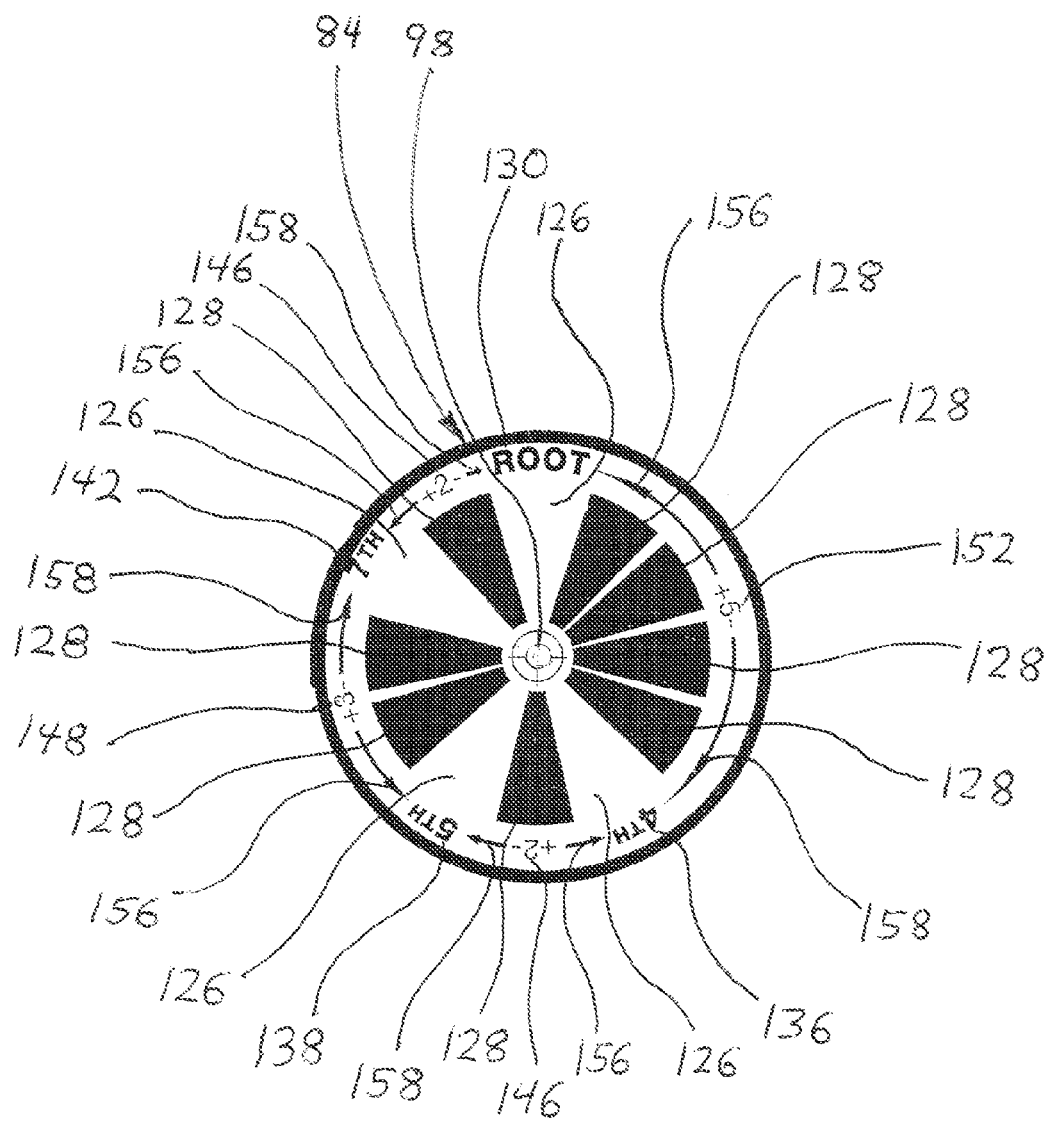
FIG. 17 is the Suspended 7<sup>th</sup> Chord Dial.

FIG. 17 shows the transparent suspended 7$^{th}$ chord Dial 84, with the Dial Pivot Hole 98 in the center. In the 12 o'clock position is the Clear 30 degree pie-shaped wedge 126, and the word Root: the lowest note of a chord in its fundamental position 130. In the 1 o'clock position is the Opaque 30 degree pie-shaped wedge 128, and the Counter-clockwise Arrow 156. In the 2 o'clock position is the Opaque 30 degree pie-shaped wedge 128. In the 2:30 Position is the Perfect Fourth (+5−), separated by 5 Half-Steps 152. In the 3 o'clock position is the Opaque 30 degree pie-shaped wedge 128. In the 4 o'clock position is the Opaque 30 degree pie-shaped wedge 128, and the Clockwise Arrow 158. In the 5 o'clock position is the Clear 30 degree pie-shaped wedge 126, and the word 4$^{th}$, the fourth degree of the Major Diatonic Scale 136. In the 6 o'clock position is the Opaque 30 degree pie-shaped wedge 128, and the Counter-clockwise Arrow 156, and the Whole-Step (+2−), separated by 2 Half-Steps 146, and the Clockwise Arrow 158. In the 7 o'clock position is the Clear 30 degree pie-shaped wedge 126, and the word 5$^{th}$ the fifth degree of the Major Diatonic Scale 138. In the 8 o'clock position is the Opaque 30 degree pie-shaped wedge 128, and the Counter-clockwise Arrow 156. In the 8:30 Position is the Minor Third (+3−), separated by 3 Half-Steps 148. In the 9 o'clock position is the Opaque 30 degree pie-shaped wedge 128, and the Clockwise Arrow 158. In the 10 o'clock position is the Clear 30 degree pie-shaped wedge 126, and the word 7$^{th}$ the seventh degree of the Major Diatonic Scale 142. In the 11 o'clock position is the Opaque 30 degree pie-shaped wedge 128, and the Counter-clockwise Arrow 156, and the Whole-Step (+2−), separated by 2 Half-Steps 146, and the Clockwise Arrow 158.

Figure 18:
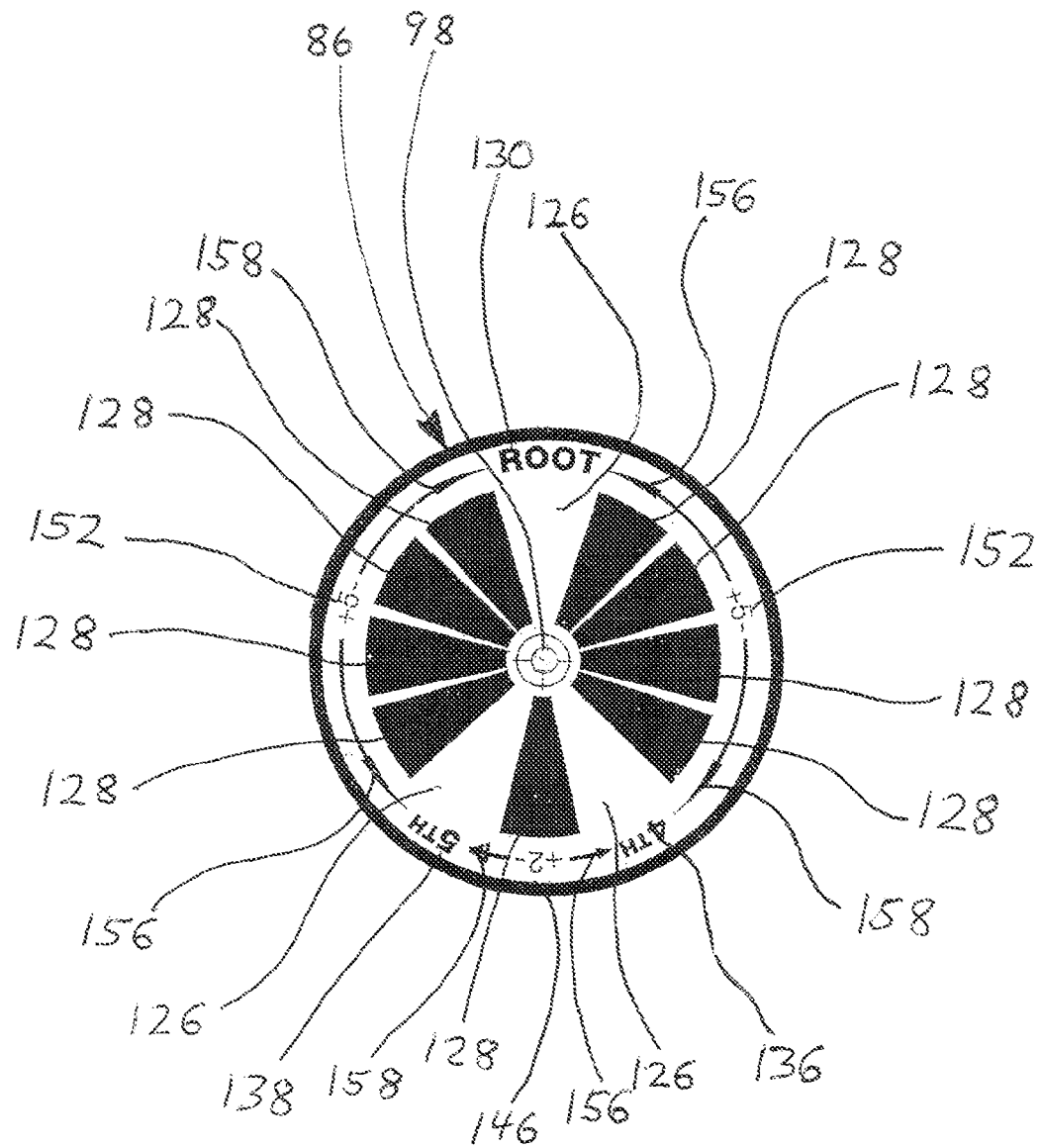
FIG. 18 is the Suspended 4<sup>th</sup> Chord Dial.

FIG. 18 shows the transparent Suspended 4$^{th}$ chord Dial 86, with the Dial Pivot Hole 98 in the center. In the 12 o'clock position is the Clear 30 degree pie-shaped wedge 126, and the word Root: the lowest note of a chord in its fundamental position 130. In the 1 o'clock position is the Opaque 30 degree pie-shaped wedge 128, and the Counter-clockwise Arrow 156. In the 2 o'clock position is the Opaque 30 degree pie-shaped wedge 128. 2:30 Position is the Perfect Fourth (+5−), separated by 5 Half-Steps 152. In the 3 o'clock position is the Opaque 30 degree pie-shaped wedge 128. In the 4 o'clock position is the Opaque 30 degree pie-shaped wedge 128, and the Clockwise Arrow 158. In the 5 o'clock position is the Clear 30 degree pie-shaped wedge 126, and the word 4$^{th}$, the fourth degree of the Major Diatonic Scale 136. In the 6 o'clock position is the Opaque 30 degree pie-shaped wedge 128, and the Counter-clockwise Arrow 156, and the Whole-Step (+2−), separated by 2 Half-Steps 146, and the Clockwise Arrow 158. In the 7 o'clock position is the Clear 30 degree pie-shaped wedge 126, and the word 5$^{th}$ the fifth degree of the Major Diatonic Scale 138. In the 8 o'clock position is the Opaque 30 degree pie-shaped wedge 128, and the Counter-clockwise Arrow 156. In the 9 o'clock position is the Opaque 30 degree pie-shaped wedge 128. In the 9:30 Position is the Perfect Fourth (+5−), separated by 5 Half-Steps 152. In the 10 o'clock position is the Opaque 30 degree pie-shaped wedge 128. In the 11 o'clock position is the Opaque 30 degree pie-shaped wedge 128, and the Clockwise Arrow 158.

Figure 19:
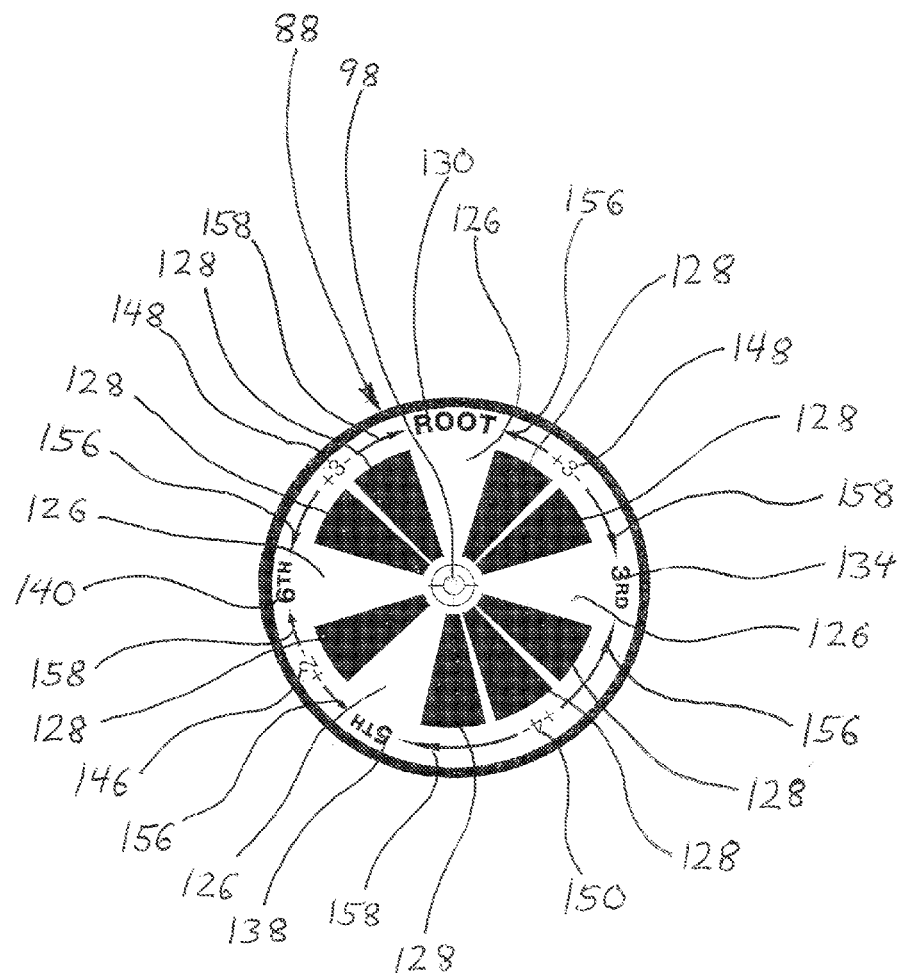
FIG. 19 is the Minor 6<sup>th</sup> Chord Dial.
Figure 20A:
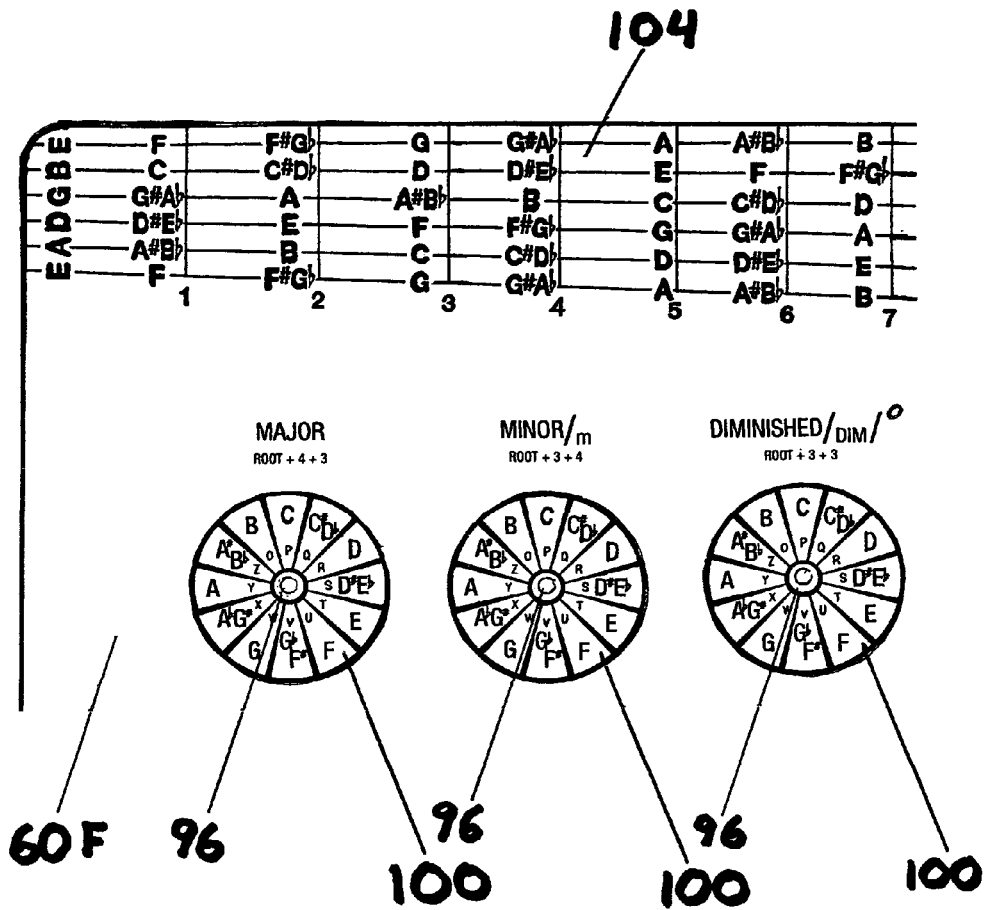
FIG. 20A provides a naked front view of the upper left quadrant of the Chordteacher.
Figure 20B:
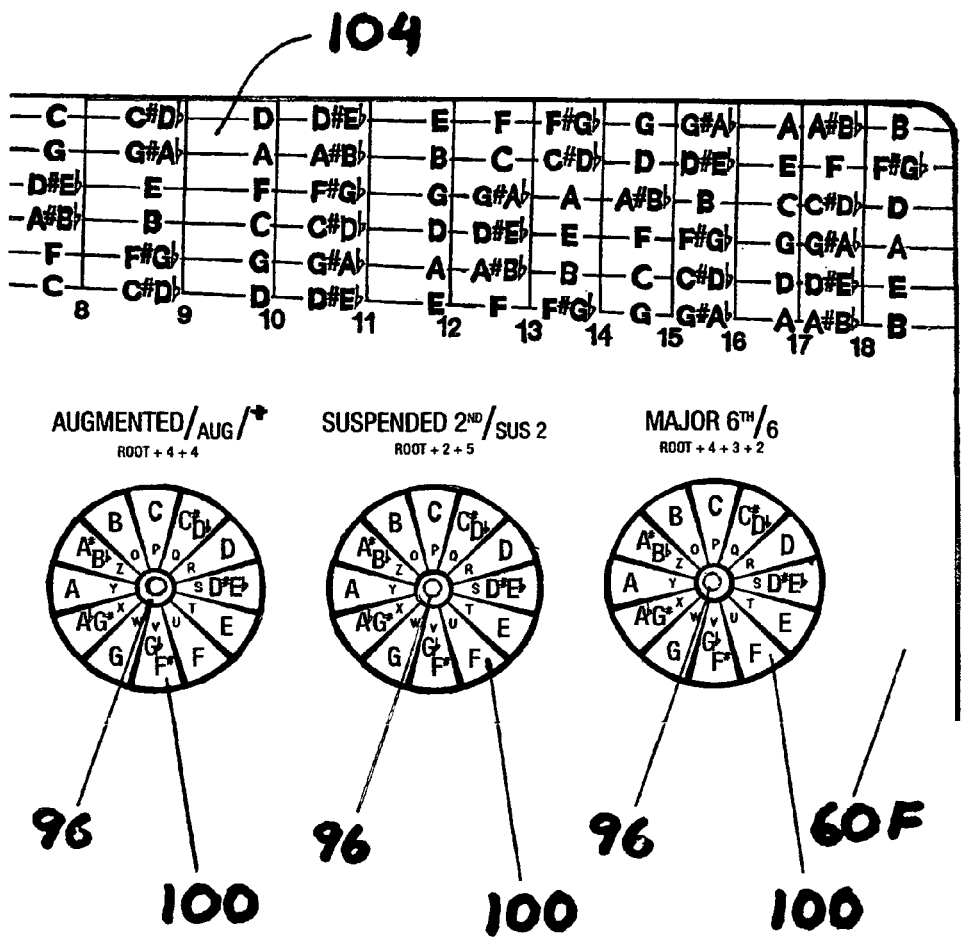
FIG. 20B provides a naked front view of the upper right quadrant of the Chordteacher.
Figure 20C:
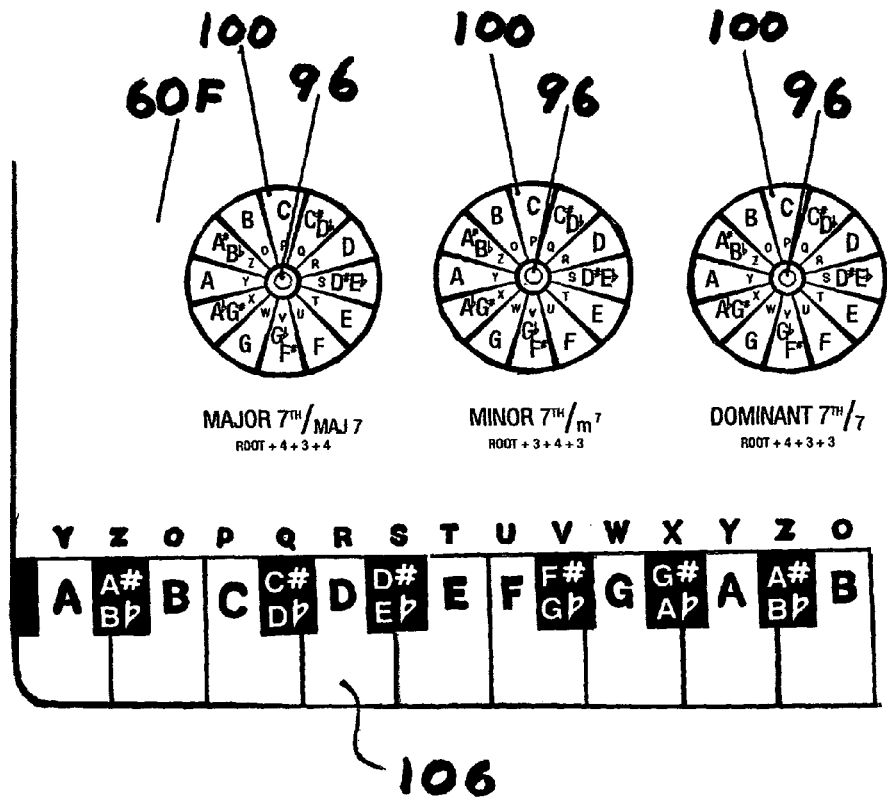
FIG. 20C provides a naked front view of the lower left quadrant of the Chordteacher.
Figure 20D:
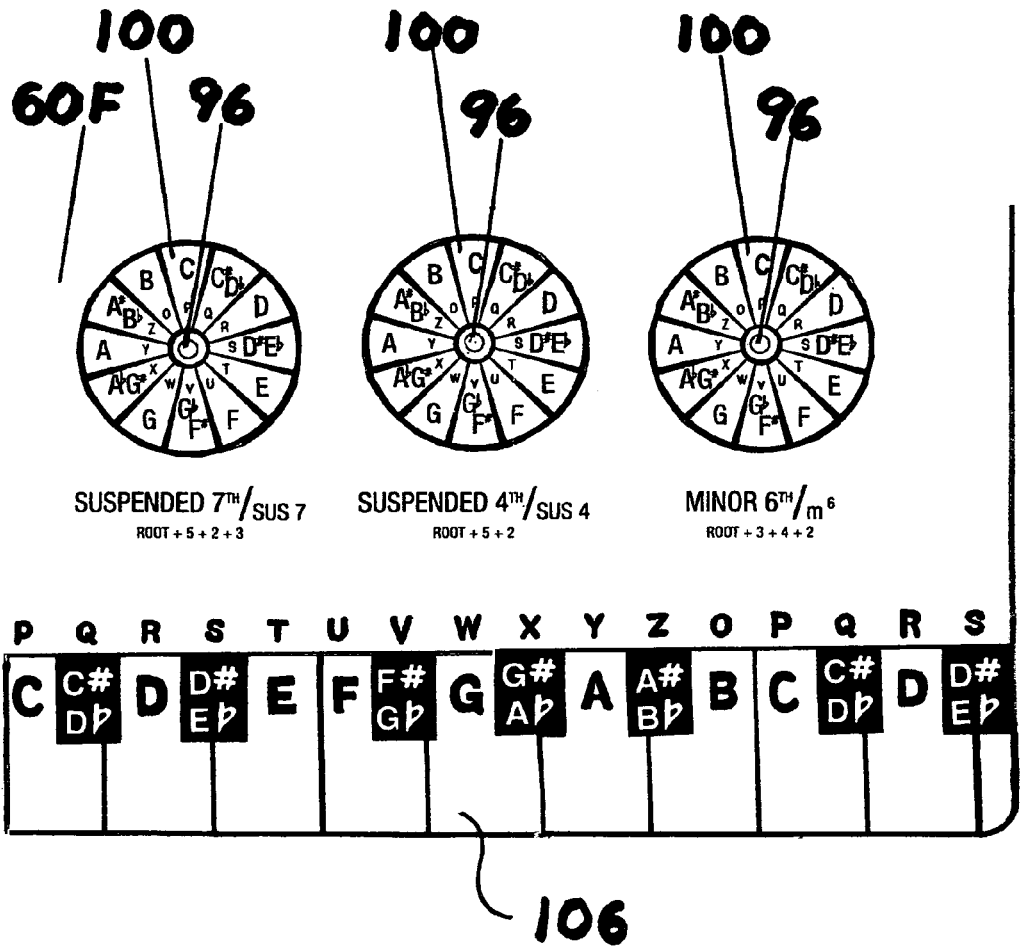
FIG. 20D provides a naked front view of the lower right quadrant of the Chordteacher.

FIG. 19 shows the transparent Minor 6$^{th}$ chord Dial 88, with the Dial Pivot Hole 98 in the center. In the 12 Position is the Clear 30 degree pie-shaped wedge 126, and the word Root: the lowest note of a chord in its fundamental position 130. In the 1 o'clock position is the Opaque 30 degree pie-shaped wedge 128, and the Counter-clockwise Arrow 156. In the 1:30 Position is the Minor Third (+3−), separated by 3 Half-Steps 148. In the 2 o'clock position is the Opaque 30 degree pie-shaped wedge 128, and the Clockwise Arrow 158. In the 3 o'clock position is the Clear 30 degree pie-shaped wedge 126, and the word 3$^{rd}$ the third degree of the Major Diatonic Scale 134. In the 4 o'clock position is the Opaque 30 degree pie-shaped wedge 128, and the Counter-clockwise Arrow 156. In the 5 o'clock position is the Opaque 30 degree pie-shaped wedge 128, and the Major Third (+4−), separated by 4 Half-Steps 150 In the 6 o'clock position is the Opaque 30 degree pie-shaped wedge 128, and the Clockwise Arrow 158. In the 7 o'clock position is the Clear 30 degree pie-shaped wedge 126, and the word 5$^{th}$ the fifth degree of the Major Diatonic Scale 138. In the 8 o'clock position is the Opaque 30 degree pie-shaped wedge 128, and the Counter-clockwise Arrow 156, and the Whole-Step (+2−), separated by 2 Half-Steps 146, and the Clockwise Arrow 158. In the 9 o'clock position is the Clear 30 degree pie-shaped wedge 126, and the word 6$^{th}$ the sixth degree of the Major Diatonic Scale 140. In the 10 o'clock position is the Opaque 30 degree pie-shaped wedge 128, and the Counter-clockwise Arrow 156. In the 10:30 Position is the Minor Third (+3−), separated by 3 Half-Steps 148. In the 11 o'clock position is the Opaque 30 degree pie-shaped wedge 128, and the Clockwise Arrow 158.

FIGS. 20A through 20D provide a naked front view of the Chordteacher 60F with the guitar-type fret board printed across the top 104. The piano-type musical keyboard with the Willoughby Scale is printed across the bottom 106. The Chordteacher 60F has thirteen base pivot holes 96. The Willoughby Scale/Chromatic Scale 100 is centered over 12 of the 13 base pivot holes 96. The center hole has Rivet 96 which holds the Diatonic Octave Dial on the back side, and has no printing around it.

Figure 21A:
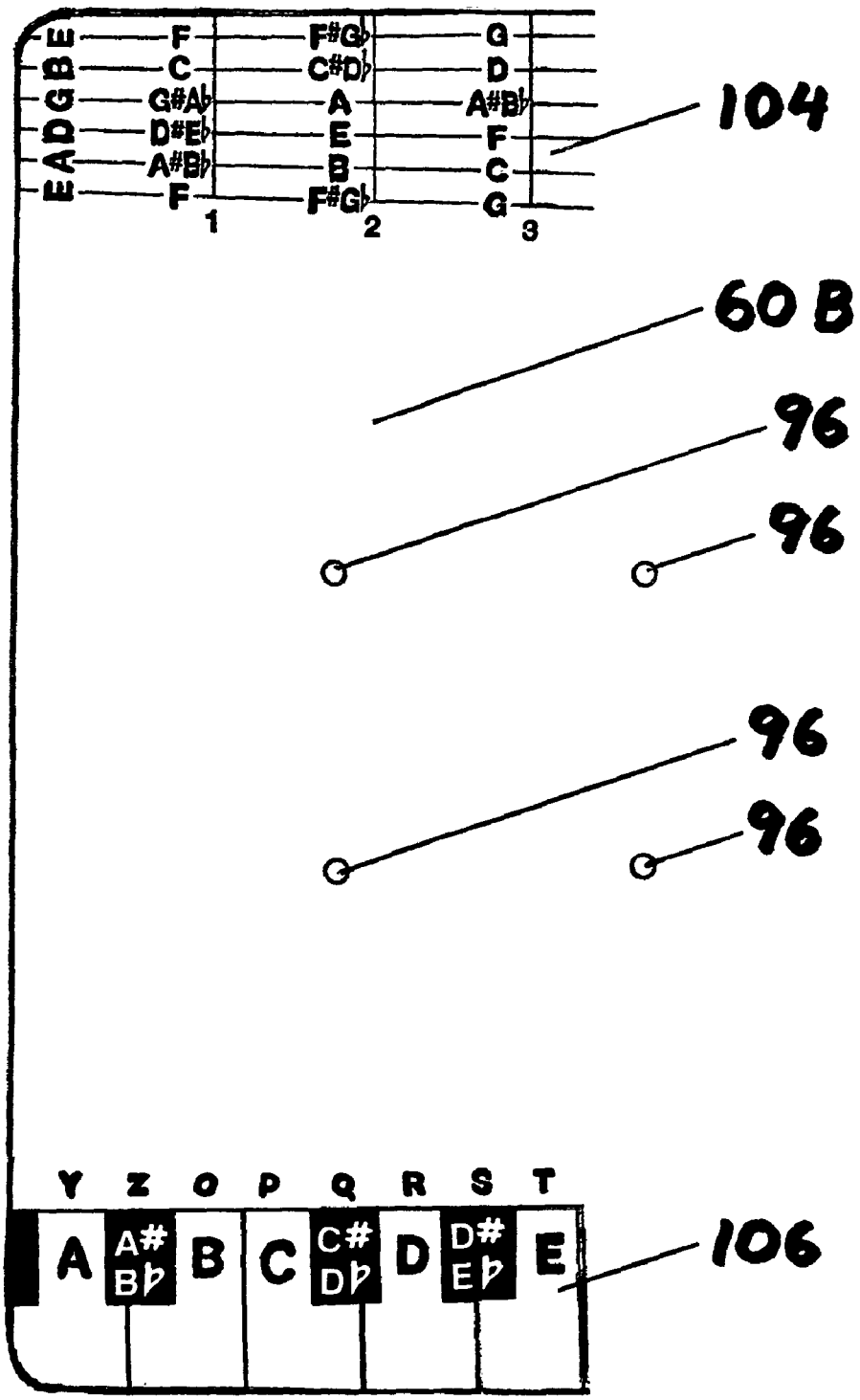
FIG. 21A provides a naked back view of the left side portion of the Chordteacher.
Figure 21B:
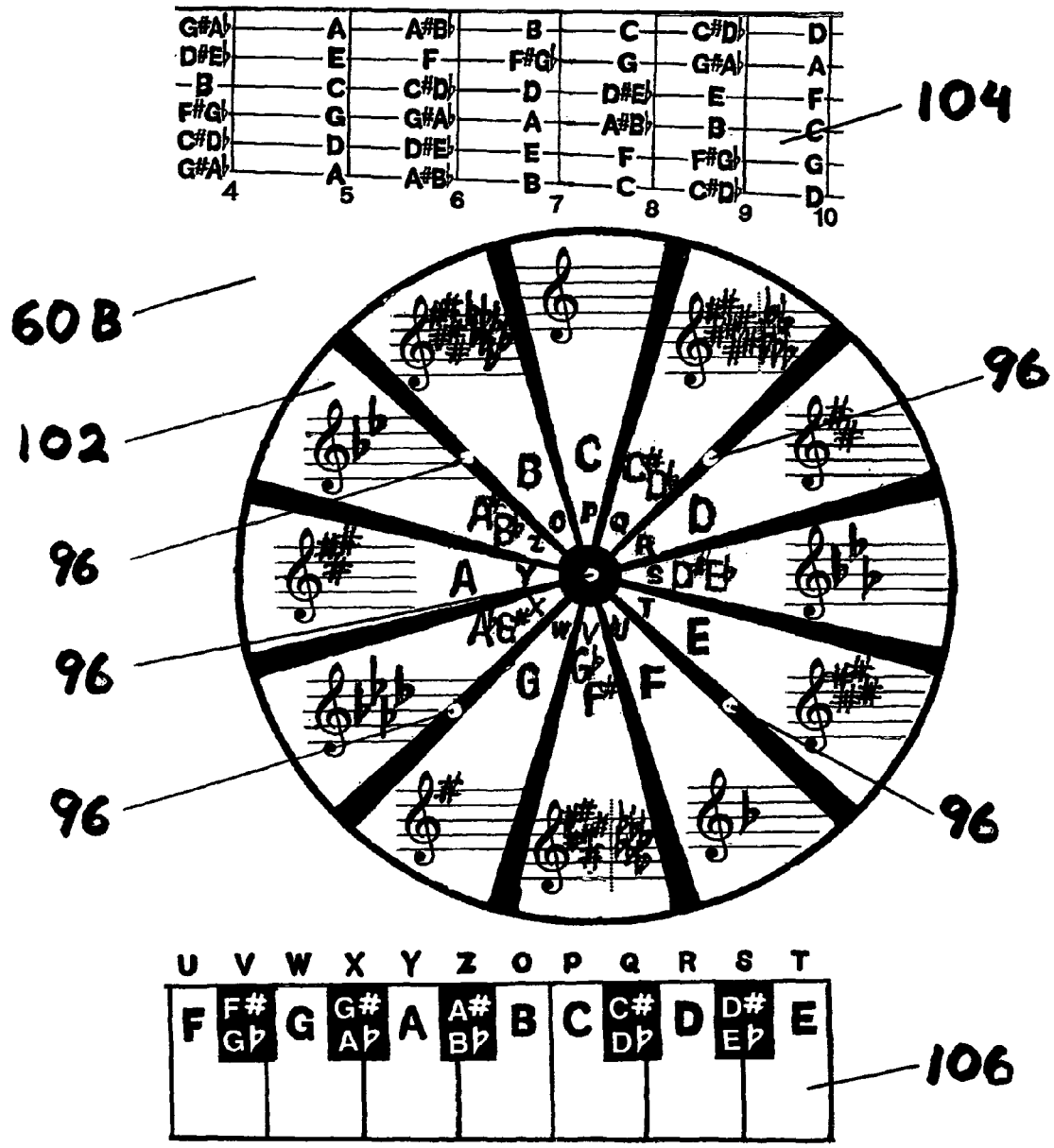
FIG. 21B provides a naked back view of the middle portion of the Chordteacher.
Figure 21C:
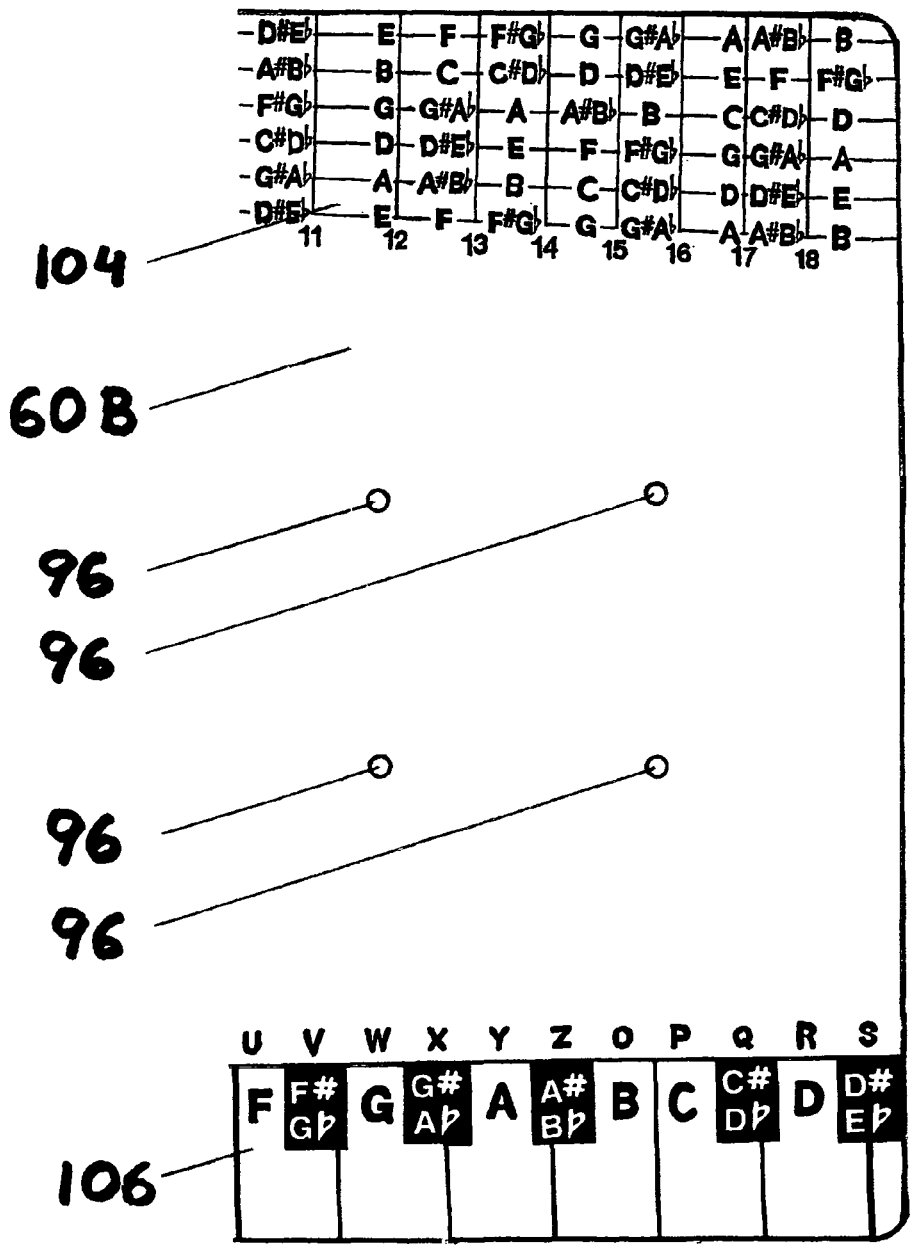
FIG. 21C provides a naked back view of the right side portion of the Chordteacher.
Figure 22A:
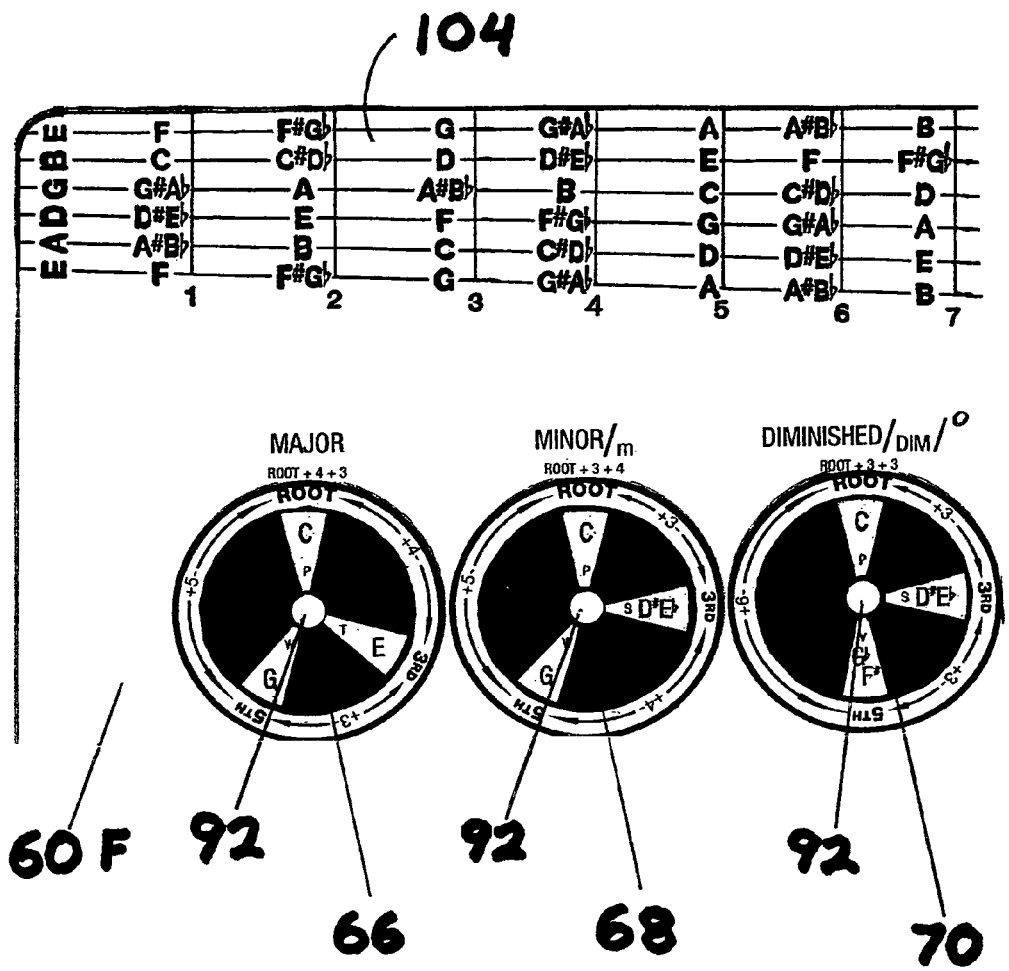
FIG. 22A provides a front view of the upper left quadrant of the fully assembled Chordteacher.
Figure 22B:
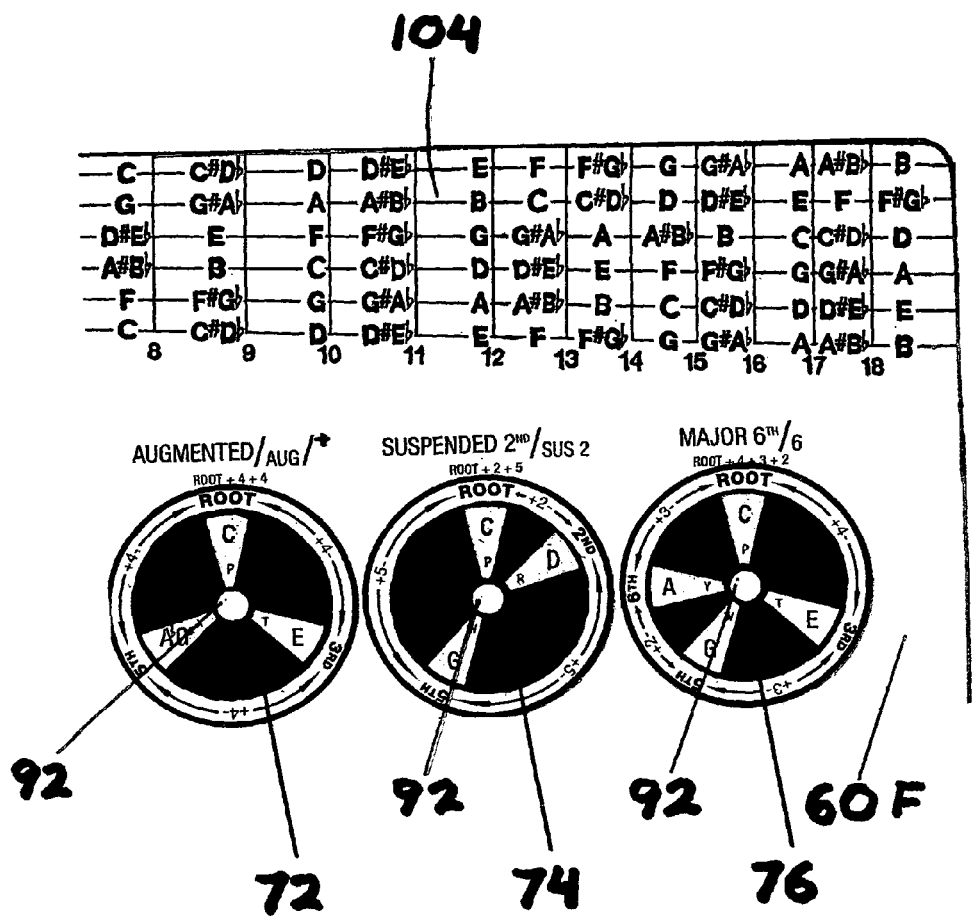
FIG. 22B provides a front view of the upper right quadrant of the fully assembled Chordteacher.
Figure 22C:
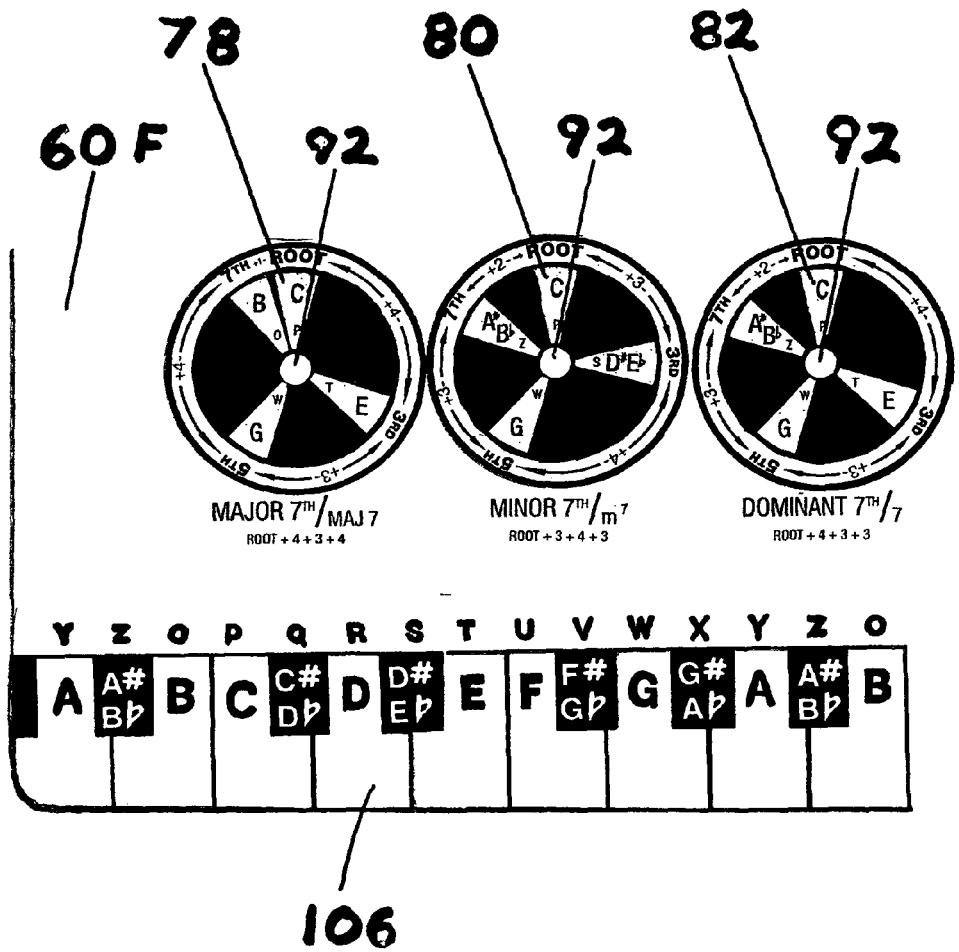
FIG. 22C provides a front view of the lower left quadrant of the fully assembled Chordteacher.
Figure 22D:
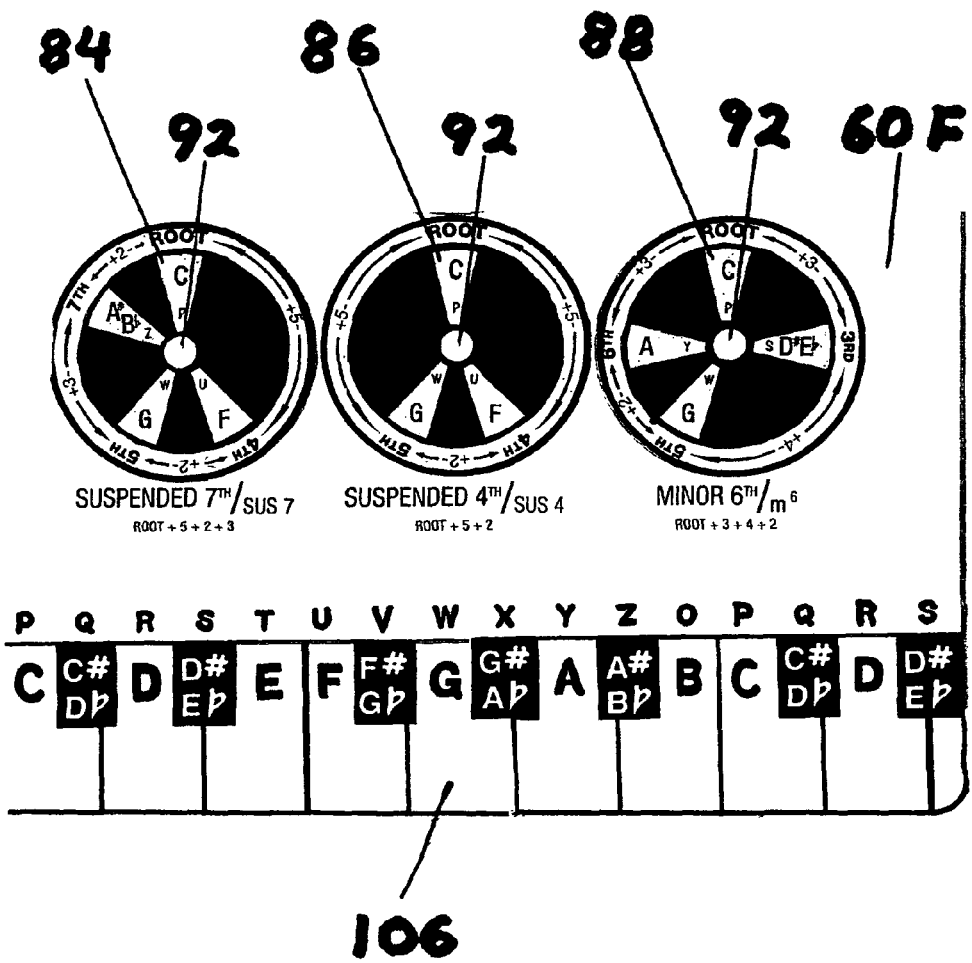
FIG. 22D provides a front view of the lower right quadrant of the fully assembled Chordteacher.

FIGS. 21A through 21C provide a naked back view of the Chordteacher 60B with the guitar-type fret board printed across the top 104. The piano-type musical keyboard with the Willoughby Scale/Chromatic Scale is printed across the bottom 106. The Chordteacher 60B has thirteen base pivot holes 96. The Willoughby Scale/Chromatic Scale/Key Signatures is a 12-piece pie shape 102 centered over the center base pivot holes 96.

FIGS. 22A through 22D provide front views of the fully assembled Chordteacher 60F with the guitar fret board printed across the top 104. The piano-type musical keyboard with the Willoughby Scale/Chromatic Scale is printed across the bottom 106. Twelve chord dials are snapped over the twelve Willoughby Scale/Chromatic Scale 100 as follows: the Major Chord Dial 66, the Minor Chord Dial 68, the Diminished Chord Dial 70, the Augmented Chord Dial 72, the Suspended $2^{nd}$ Chord Dial 74, the Major $6^{th}$ Chord Dial 76, the Major $7^{th}$ Chord Dial 78, the Minor $7^{th}$ Chord Dial 80, the Dominant $7^{th}$ Chord Dial 82, the Suspended $7^{th}$ Chord Dial 84, the Suspended $4^{th}$ Chord Dial 86, and the Minor $6^{th}$ Chord Dial 88. Each of the chord dials is attached to the Chordteacher Base 60F with a nylon or similar Rivet 92. Also in the center is Rivet 92 which holds the Diatonic Octave Dial to the other side.

Figure 23A:
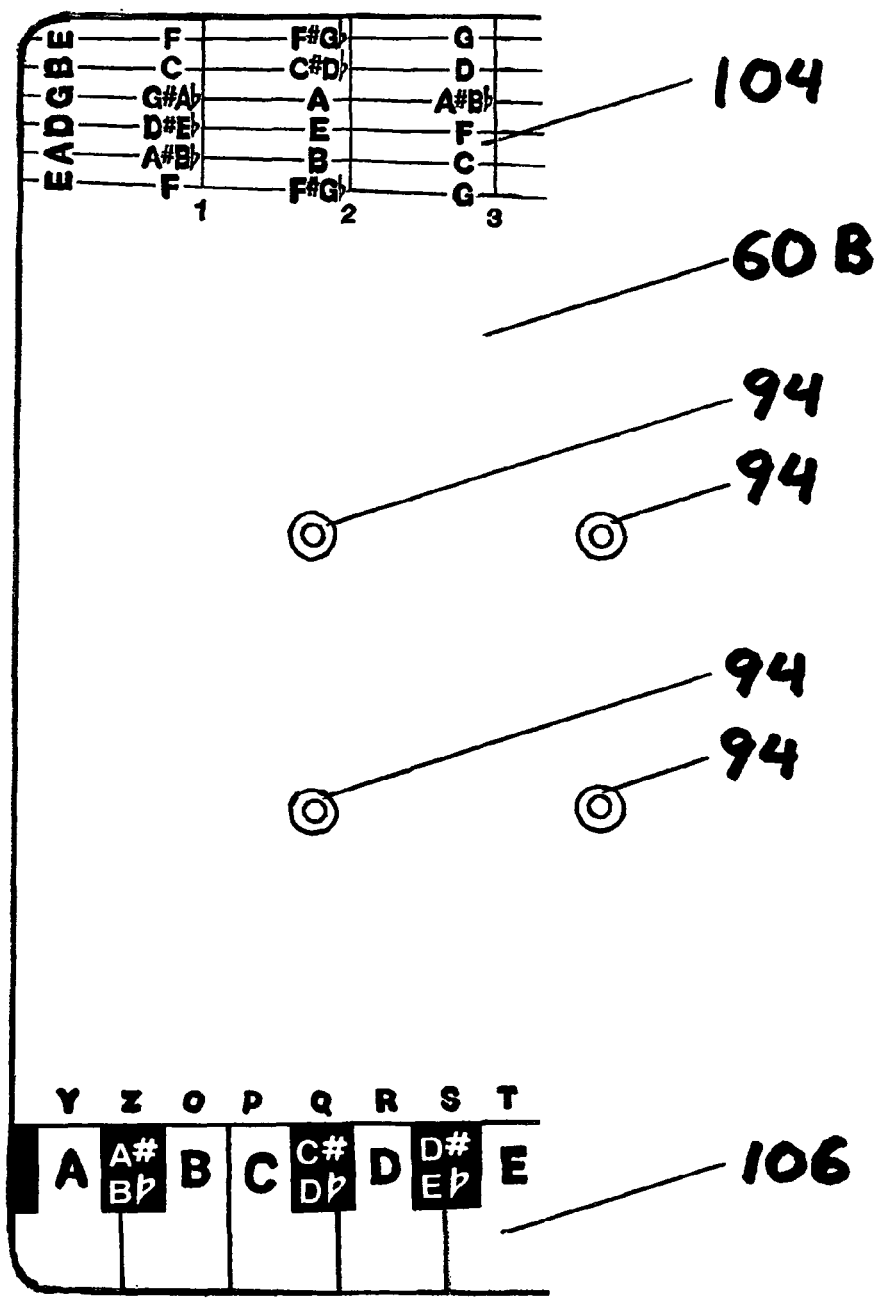
FIG. 23A provides a back view of the left side portion of the fully assembled Chordteacher.
Figure 23B:
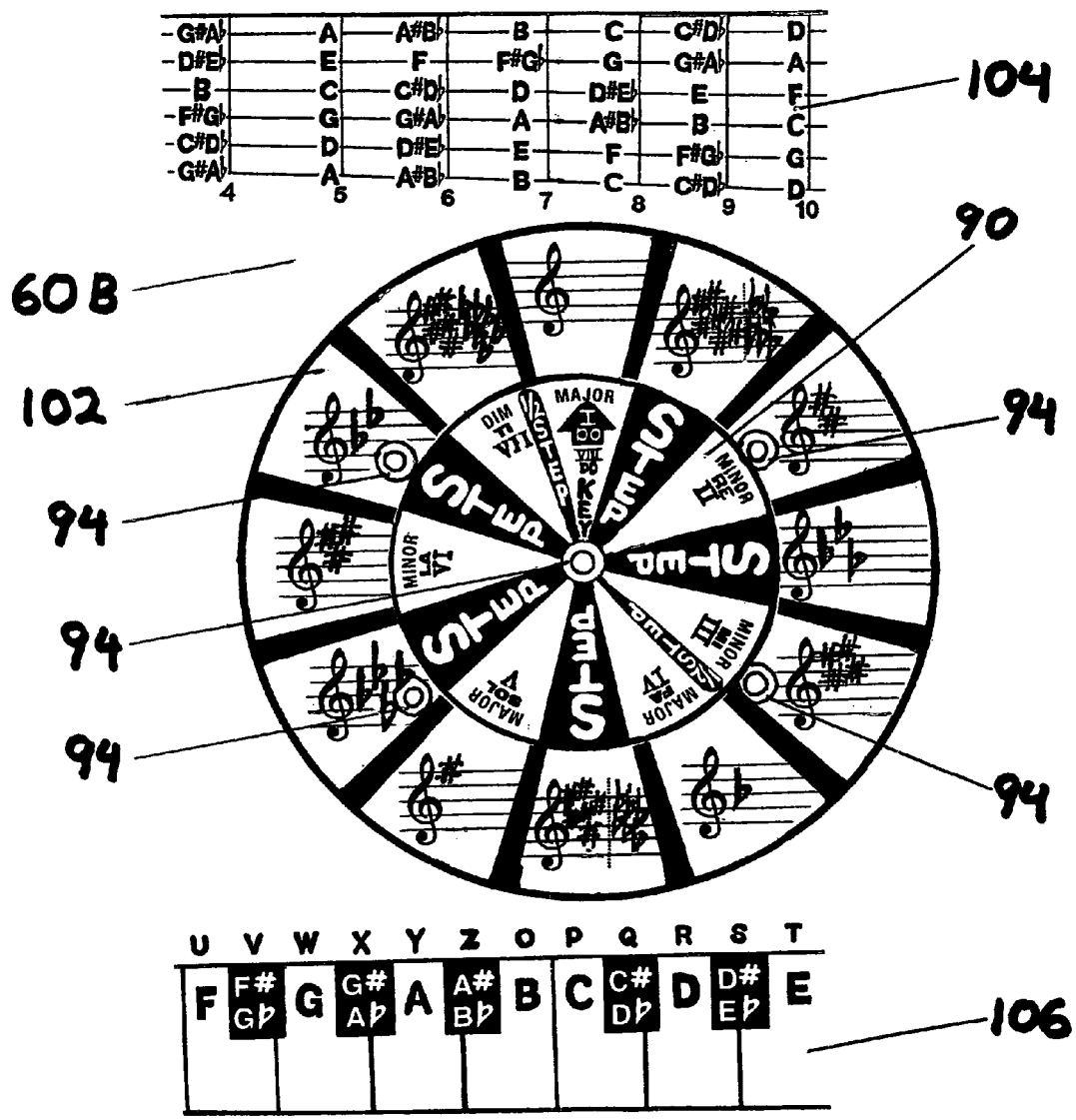
FIG. 23B provides a back view of the middle portion of the fully assembled Chordteacher.
Figure 23C:
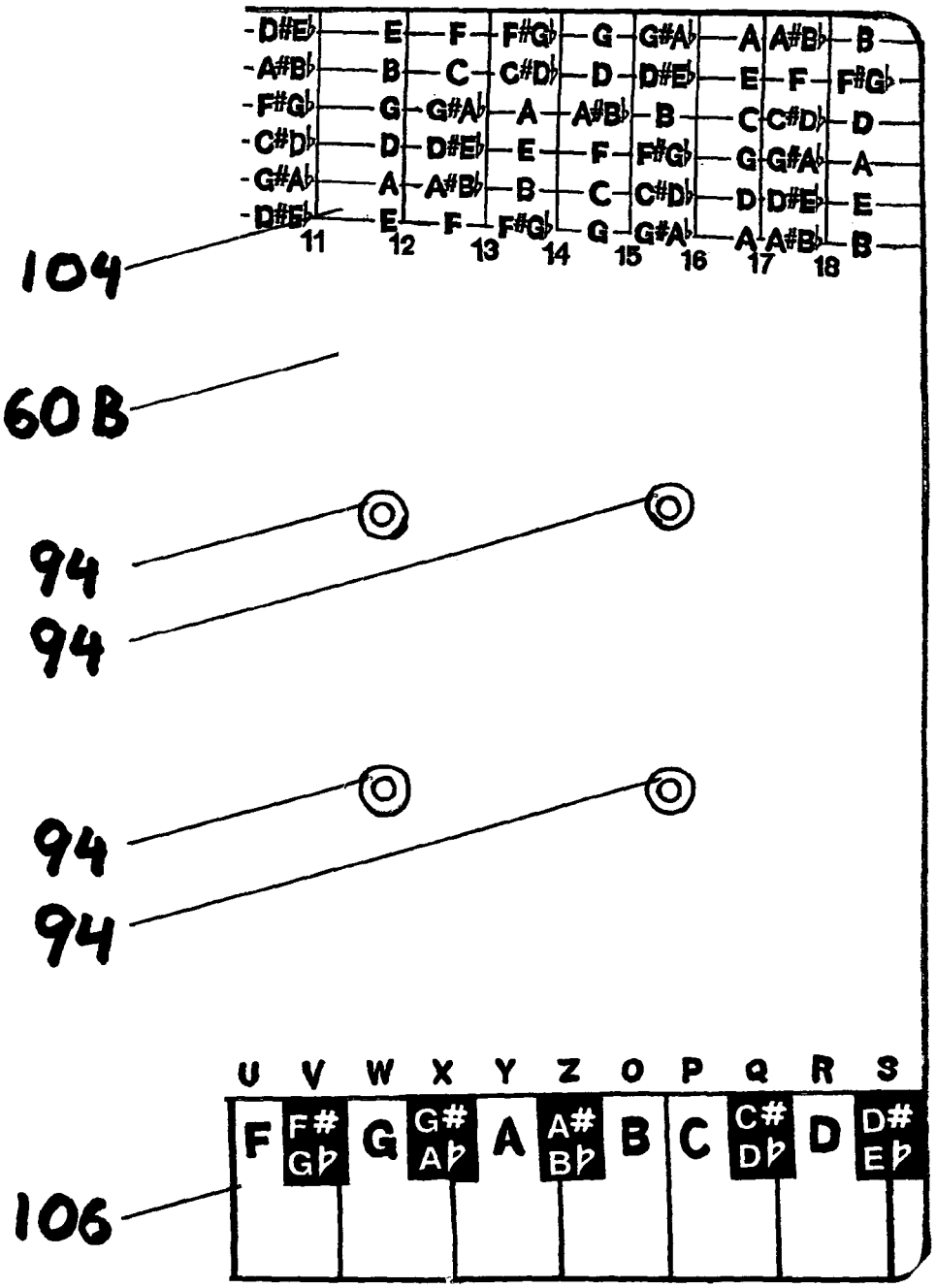
FIG. 23C provides a back view of the right side portion of the fully assembled Chordteacher.

FIGS. 23A through 23C provide back side views of the fully assembled Chordteacher 60B with the guitar-type fret board printed across the top 104. The piano-type musical keyboard with the Willoughby Scale/Chromatic Scale is printed across the bottom 106. There is one Diatonic Octave Dial 90 centered on the back over the Willoughby Scale/Chromatic Scale/Key Signatures 102 with the 12-piece color-coded pie shape. Each piece of the pie is a 30 degree pie-shaped wedge. There are 13 nylon or similar Rivet Clasps 94: one securing the Diatonic Octave Dial, and the other 12 nylon or similar Rivet Clasps 94 securing the nylon or similar Rivets 92 that protrude from the other side.

FIG. 24 is the top view of the fully assembled Chordteacher 60 with Diatonic Octave Dial 90, Major Chord Dial 66, Minor Chord Dial 68, Diminished Chord Dial 70, Augmented Chord Dial 72, Suspended $2^{nd}$ Chord Dial 74, and Major $6^{th}$ Chord Dial 76, all secured to the Chordteacher Base 60 by nylon or similar Rivets 92 and Rivet Clasps 94.

FIG. 25 is the bottom view of the fully assembled Chordteacher 60 with Diatonic Octave Dial 90, Major $7^{th}$ Chord Dial 78, Minor $7^{th}$ Chord Dial 80, Dominant $7^{th}$ Chord Dial 82, Suspended $7^{th}$ Chord Dial 84, Suspended $4^{th}$ Chord Dial 86, and Minor $6^{th}$ Chord Dial 88, all secured to the Chordteacher Base 60 by nylon or similar Rivets 92 and Rivet Clasps 94.

Figure 26:
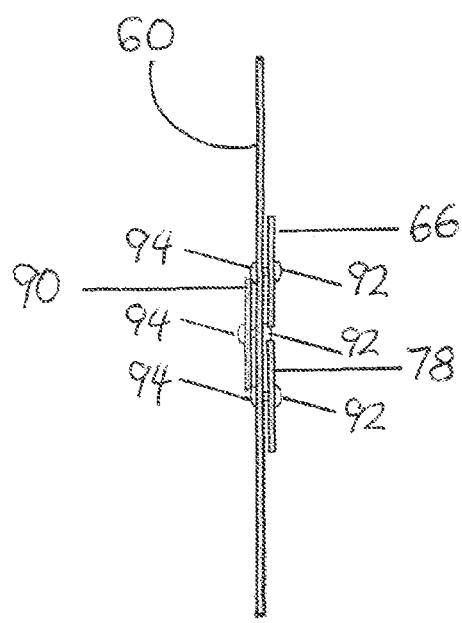
FIG. 26 is the left view of the fully assembled Chordteacher.

FIG. 26 is the left side view of the fully assembled Chordteacher 60 with Diatonic Octave Dial 90, Major Chord Dial 66, and Major $7^{th}$ Chord Dial 78, all secured to the Chordteacher Base 60 by nylon or similar Rivets 92 and Rivet Clasps 94.

Figure 27:
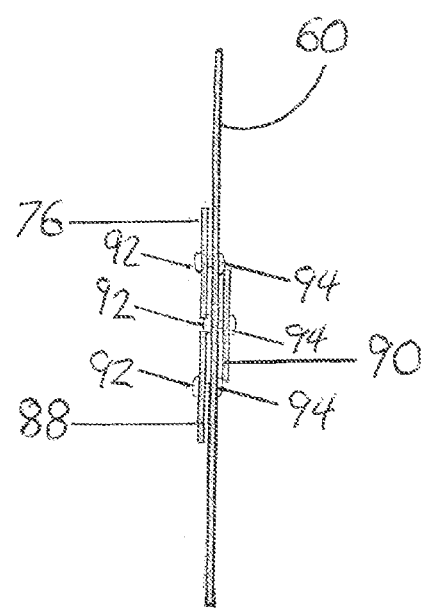
FIG. 27 is the right view of the fully assembled Chordteacher.

FIG. 27 is the right side view of the fully assembled Chordteacher 60 with Diatonic Octave Dial 90, Major $6^{th}$ Chord Dial 76, and Minor $6^{th}$ Chord Dial 88, all secured to the Chordteacher Base 60 by nylon or similar Rivets 92 and Rivet Clasps 94.

Finally, the following parts list for the drawing figures may be found to be of assistance in understanding more fully the concepts of our invention:

58 Keyboard such as a piano, organ, harpsichord, or electronic music keyboard
60 Chordteacher Base
60F Chordteacher Base, front view
60B Chordteacher Base, back view
60 Guitar
64 Guitarist
66 Major Chord Dial
68 Minor Chord Dial
70 Diminished Chord Dial
72 Augmented Chord Dial
74 Suspended $2^{nd}$ Dial
76 Major $6^{th}$ Chord Dial
78 Major $7^{th}$ Chord Dial
80 Minor $7^{th}$ Chord Dial
82 Dominant $7^{th}$ Chord Dial
84 Suspended $7^{th}$ Chord Dial
86 Suspended $4^{th}$ Chord Dial
88 Minor $6^{th}$ Chord Dial
90 Diatonic Octave Dial
92 Nylon Rivet
94 Nylon Rivet Clasp
96 Base Pivot Hole
98 Dial Pivot Hole
100 Willoughby Scale/Chromatic Scale is a 12-piece pie shape. Each piece of the pie is a 30 degree pie-shaped wedge.
102 Willoughby Scale/Chromatic Scale/Key Signatures is a 12-piece pie shape. Each piece of the pie is a 30 degree pie-shaped wedge.
104 Guitar Neck Indicia with each string, fret, and Chromatic Scale notes labeled
106 Piano Keyboard labeled according to the Chromatic and Willoughby Scales
108 Step: opaque 30 degree pie-shaped wedge with the word STEP
110 Half-step: the gap between two clear wedges with the word ½ STEP
112 Clear 30 degree pie-shaped wedge with the words KEY, DO, VIII, DO, I, and MAJOR
114 Clear 30 degree pie-shaped wedge with the words II, RE, MINOR
116 Clear 30 degree pie-shaped wedge with the words III, MI, MINOR
118 Clear 30 degree pie-shaped wedge with the words IV, FA, MAJOR
120 Clear 30 degree pie-shaped wedge with the words V, SOL, MAJOR
122 Clear 30 degree pie-shaped wedge with the words R.M. (Relative Minor), VI, LA, MINOR.
124 Clear 30 degree pie-shaped wedge with the words VII, TI,
126 is the Clear 30 degree pie-shaped wedge 126.
128 is the Opaque 30 degree pie-shaped wedge 128.
130 Root and the word Root: the lowest note of a chord in its fundamental position 130.
132 Second: and the word $2^{nd}$ the second degree of the Major Diatonic Scale 132.
134 Third: and the word $3^{rd}$ the third degree of the Major Diatonic Scale 134.

136 Fourth: and the word 4$^{th}$, the fourth degree of the Major Diatonic Scale 136.
138 Fifth: and the word 5$^{th}$ the fifth degree of the Major Diatonic Scale 138.
140 Sixth: and the word 6$^{th}$ the sixth degree of the Major Diatonic Scale 140.
142 Seventh: and the word 7$^{th}$ the seventh degree of the Major Diatonic Scale 142.
144 +1– is the Half-Step (+1–), separated by 1 Half-Step 144.
146 +2– and the Whole-Step (+2–), separated by 2 Half-Steps 146.
148 +3– is the Minor Third (+3–), separated by 3 Half-Steps 148.
150 +4– and the Major Third (+4–), separated by 4 Half-Steps 150.
152 +5– is the Perfect Fourth (+5–), separated by 5 Half-Steps 152.
154 +6– and the Tritone (+6–), separated by 6 Half-Steps 154.
156 and the Counter-clockwise Arrow 156.
158 and the Clockwise Arrow 158.

In conclusion, it can be stated that my inventions, as described herein, present new and useful ways to explore and practically apply the scientific relationships between music, harmony and mathematics. The Willoughby Scale eliminates the confusion generated by the old-school traditional use of sharps and flats in the chromatic scale by renaming each note with the last 12 letters of the alphabet. The Willoughby Scale renames the Chromatic Notes as follows:

| | | |
|---|---|---|
| B = O | D#/E flat = S | G = W |
| C = P | E = T | G#/A flat = X |
| C#/D flat = Q | F = U | A = Y |
| D = R | F#/G flat = V | A#/B flat = Z |

This is a teaching aid for guitars and keyboard instruments, but not limited to these instruments, because these chords are applicable to all musical instruments and the science of sound and harmonics. The preferred embodiment of the apparatus of my invention is, to keep it as simple as possible, a musical indicating device for finding the 12 most common chord types and their inversions on string and fretted musical instruments, such as guitars, bass guitars, and musical keyboards such as pianos, organs, harpsichords, electronic keyboards and the like, but not limited to these instruments. To reiterate, the front of the preferred embodiment of the apparatus of my invention features 12 different transparent chord dials that are each pivotally attached to the base member over a color-coded, pie-shaped diagram of the Willoughby Scale/Chromatic Scale. Each dial has selectively aligned indicia that correspond to each chord type. This is a color-coded music system for teaching Western music, having 12 radial marks, each displayed 30 degrees apart, and corresponding to the 12 semi-tones of the Willoughby Scale/Chromatic Scale. Across the top front surface of the base member are indicia representing the strings, frets, and notes of a guitar or bass guitar. Across the bottom front surface of the base member is a black and white piano-type keyboard with each note color-coded and labeled according to the Chromatic Scale, with the Willoughby Scale printed directly above the notes of the Chromatic Scale. On the back is the transparent Diatonic Octave Dial pivotally attached to the base member over a color-coded diagram of the Chromatic Scale/Willoughby Scale with the Key Signatures around it. The octave dial has selectively aligned indicia that represent the notes of the major form of the diatonic scale. The Chordteacher is also the mathematical link of Willoughby's Dream (mathematically base 24) and Willoughby's Harmonic Clock (mathematically base 48), which are covered in my copyright of the Chordteacher 2009.

However, though the foregoing description represents a full and complete disclosure of the preferred embodiment of my invention, it should be remembered that numerous variations are possible without deviating from and/or exceeding the spirit and scope of my invention as described herein. Moreover, various of the above-disclosed features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the claims which follow.

I claim:
1. A music teaching and facilitation device, comprising:
   a planar base member having a front, a back, an upper edge, and a lower edge;
   an elongate front figure on said front along one of said upper and lower edges representing a stringed fret board of a stringed musical instrument, said figure comprising horizontal lines representing strings for the said musical instrument and intersecting vertical lines representing frets for the said musical instrument, with all applicable chromatic notes labeled at the intersections of strings and frets;
   an elongate front figure on said front along the other of said upper and lower edges representing keys of a keyboard instrument, with all applicable chromatic notes on said keys being labeled; and
   a plurality of circular front figures intermediate said elongate figures on said front, which circular figures are subdivided into twelve pie-piece shaped segments with each of said segments representing one of the twelve chromatic notes of western music.
2. The device of claim 1, further comprising:
   an elongate back figure on said back along one of said upper and lower edges representing a stringed fret board of a stringed musical instrument, said figure comprising horizontal lines representing strings for the said musical instrument and intersecting vertical lines representing frets for the said musical instrument, with all applicable chromatic notes labeled at the intersections of strings and frets;
   an elongate back figure on said back along the other of said upper and lower edges representing keys of a keyboard instrument, with all applicable chromatic notes on said keys being labeled; and
   a circular back figure intermediate the elongate figures on said back, which circular figure is subdivided into twelve pie-piece shaped segments with each of said segments representing one of the twelve chromatic notes of western music, the indicia of the key signatures of western music being indicated on the twelve pie-shaped pieces.
3. The device of claim 1, wherein at least one of
   said figures are labeled with notes of the Willoughby scale as well as with notes of the chromatic scale,
   said notes are color coded, and
   said plurality of front circular figures each represent a scale of Western music and each has a rotatable chord dial mounted thereon, which chord dial can be rotated to different positions to indicate notes making up chords of each said scale.

4. The device of claim 2, wherein at least one of
said figures are labeled with notes of the Willoughby scale as well as with notes of the chromatic scale,
said notes are color coded,
said plurality of front circular figures each represent a scale of Western music and each has a rotatable chord dial mounted thereon, which chord dial can be rotated to different positions to indicate notes making up chords of each said scale, and
said back circular figure has a rotatable diatonic octave dial mounted thereon, which diatonic octave dial includes indicia of the diatonic octave comprising in this order clockwise, Do (I) major key Do (VIII), step, Re (II) minor, step, Mi (III) minor, ½ step, Fa (IV) major, step, Sol (V) major, step, La (VI) minor R M, step, Ti (VII) dim, ½ step.

5. A music teaching and facilitation device, comprising:
a planar base member having a front, a back, an upper edge, and a lower edge;
an elongate back figure on said back along one of said upper and lower edges representing a stringed fret board of a stringed musical instrument, said figure comprising horizontal lines representing strings for the said musical instrument and intersecting vertical lines representing frets for the said musical instrument, with all applicable chromatic notes labeled at the intersections of strings and frets;
an elongate back figure on said back along the other of said upper and lower edges representing keys of a keyboard instrument, with all applicable chromatic notes on said keys being labeled; and
a circular back figure intermediate the elongate figures on said back, which circular figure is subdivided into twelve pie-piece shaped segments with each of said segments representing one of the twelve chromatic notes of western music, the indicia of the key signatures of western music being indicated on the twelve pie-shaped pieces.

6. The device of claim 5, wherein at least one of
said figures are labeled with notes of the Willoughby scale as well as with notes of the chromatic scale,
said notes are color coded, and
said back circular figure has a rotatable diatonic octave dial mounted thereon, which diatonic octave dial includes indicia of the diatonic octave comprising in this order clockwise, Do (I) major key Do (VIII), step, Re (II) minor, step, Mi (III) minor, ½ step, Fa (IV) major, step, Sol (V) major, step, La (VI) minor R M, step, Ti (VII) dim, ½ step.

7. The device of claim 1, wherein at least one of
said planar base member is comprised of a flat sheet-like material,
said planar base member is comprised of a semi-flexible material,
said dials are connected to said base member by rivets.

8. The device of claim 2, wherein at least one of
said planar base member is comprised of a flat sheet-like material,
said planar base member is comprised of a semi-flexible material,
said dials are connected to said base member by rivets.

9. The device of claim 3, wherein at least one of
said planar base member is comprised of a flat sheet-like material,
said planar base member is comprised of a semi-flexible material,
said dials are connected to said base member by rivets.

10. The device of claim 4, wherein at least one of
said planar base member is comprised of a flat sheet-like material,
said planar base member is comprised of a semi-flexible material,
said dials are connected to said base member by rivets.

11. The device of claim 5, wherein at least one of
said planar base member is comprised of a flat sheet-like material,
said planar base member is comprised of a semi-flexible material,
said dials are connected to said base member by rivets.

12. The device of claim 6, wherein at least one of
said planar base member is comprised of a flat sheet-like material,
said planar base member is comprised of a semi-flexible material,
said dials are connected to said base member by rivets.

* * * * *